United States Patent [19]

Takemura et al.

[11] Patent Number: 4,634,945
[45] Date of Patent: Jan. 6, 1987

[54] APPARATUS FOR AUTOMATICALLY OPENING AND CLOSING AN OPENING COVERING MEMBER

[75] Inventors: Shinji Takemura, Toyota; Tsuneo Hida, Toyokawa; Yutaka Matsuzaki, Nagoya; Kenichi Ohnishi, Toyota, all of Japan

[73] Assignees: Aisin Seiki Kabushiki Kaisha; Toyota Jidosha Kabushiki Kaisha, both of Japan

[21] Appl. No.: 675,666

[22] Filed: Nov. 28, 1984

[30] Foreign Application Priority Data

Nov. 28, 1983 [JP] Japan .................... 58-223897

[51] Int. Cl.$^4$ .............................. B60J 7/05
[52] U.S. Cl. ..................... 318/469; 318/266; 318/434; 318/474; 49/28
[58] Field of Search ............. 318/266, 282, 286, 434, 318/467, 468, 469, 474, 490; 49/26, 27, 28

[56] References Cited

U.S. PATENT DOCUMENTS 4,383,206  5/1983  Matsuoka et al. ............ 318/445
4,468,063  8/1984  Yukimoto et al. ............ 296/223
4,533,901  8/1985  Lederle .................... 49/28

FOREIGN PATENT DOCUMENTS 59-20726  2/1984  Japan .

Primary Examiner—William M. Shoop, Jr.
Assistant Examiner—Bentsu Ro
Attorney, Agent, or Firm—Sughrue, Mion, Zinn, Macpeak, and Seas

[57] ABSTRACT

An apparatus for automatically opening and closing a closure panel associated with an opening formed in the roof of an automobile is disclosed. The apparatus drives the closure panel for tilt open and tilt closed operation and for slide open and slide closed operation. During the sliding movement of the panel, the apparatus detects a load on a panel drive mechanism in a zone where the loads are normally low, and deenergizes the panel drive mechanism in the event of occurrence of an overload. In a zone where the loads are normally high as the panel presses against a weather strip, no deenergization of the panel drive mechanism occurs during an interval allocated for overload detection. The apparatus energizes alarm means during the time the panel is driven in the closing direction in a selected mode in order to draw the attention of a vehicle driver. For assuring the safeguard of the panel, the panel is stopped temporarily during the slide closed operation at a point which leaves a given opening.

10 Claims, 25 Drawing Figures

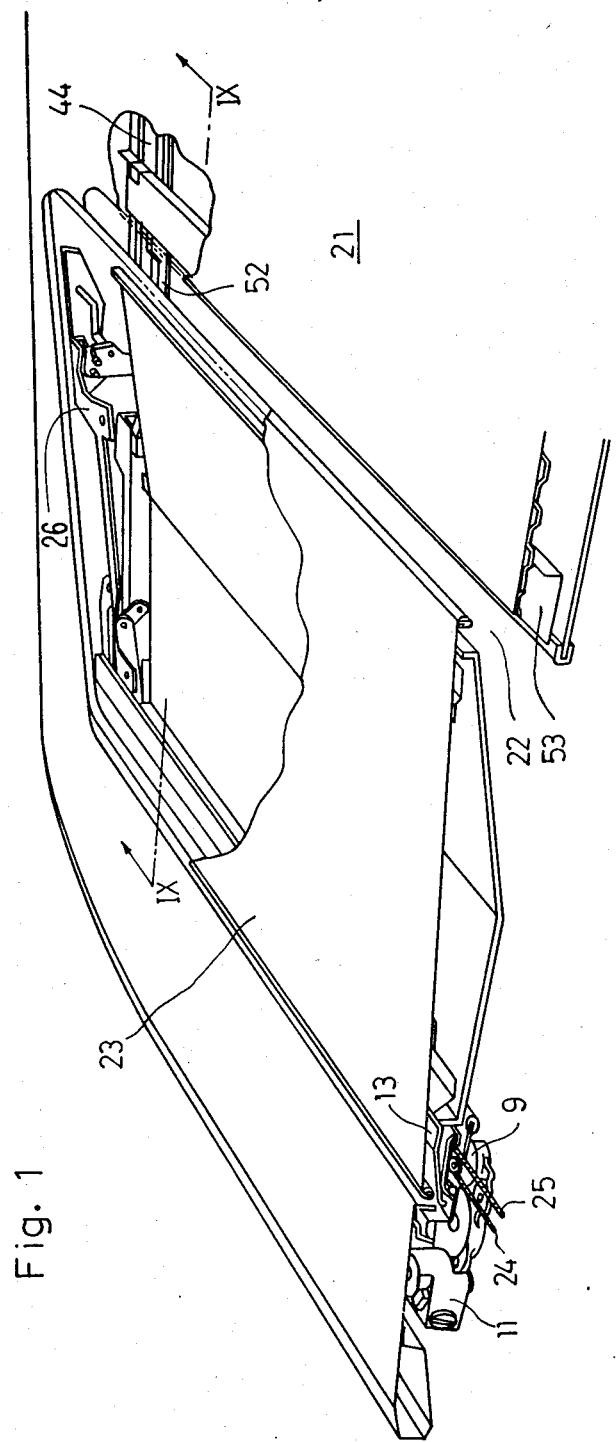
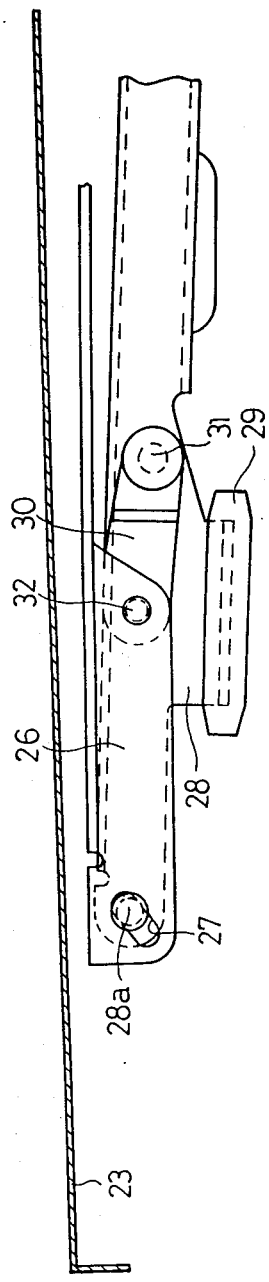
Fig. 1
Fig. 2

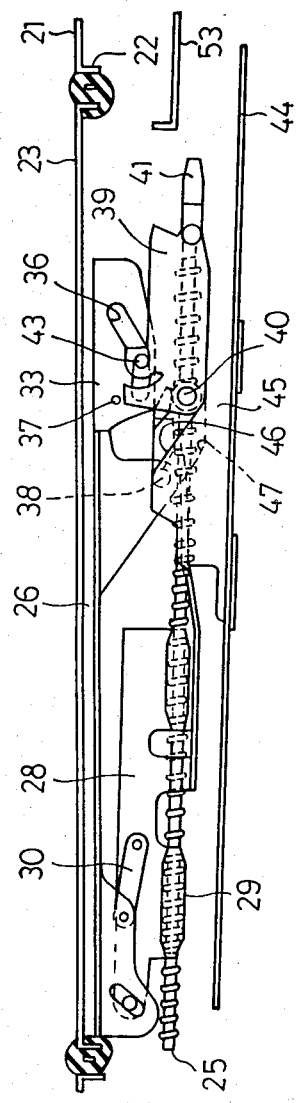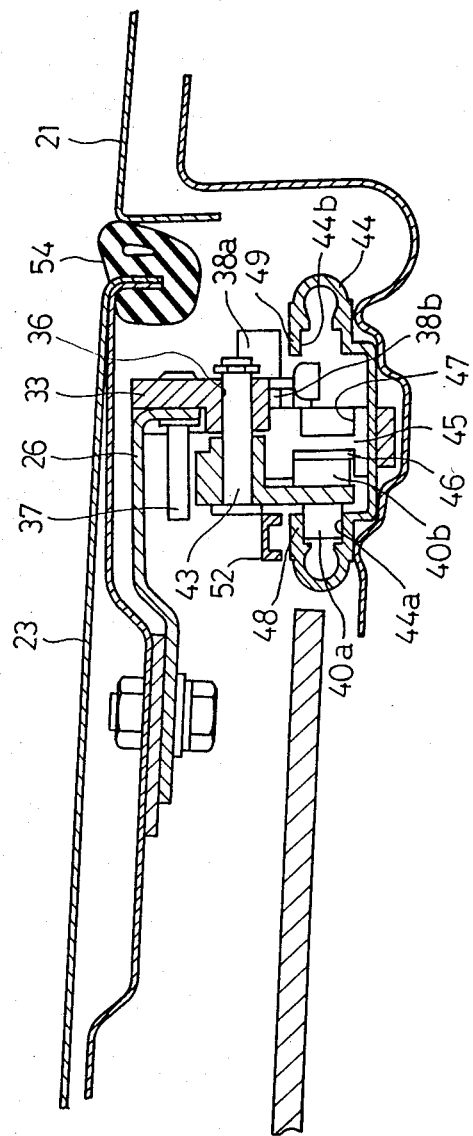
Fig. 5
Fig. 6

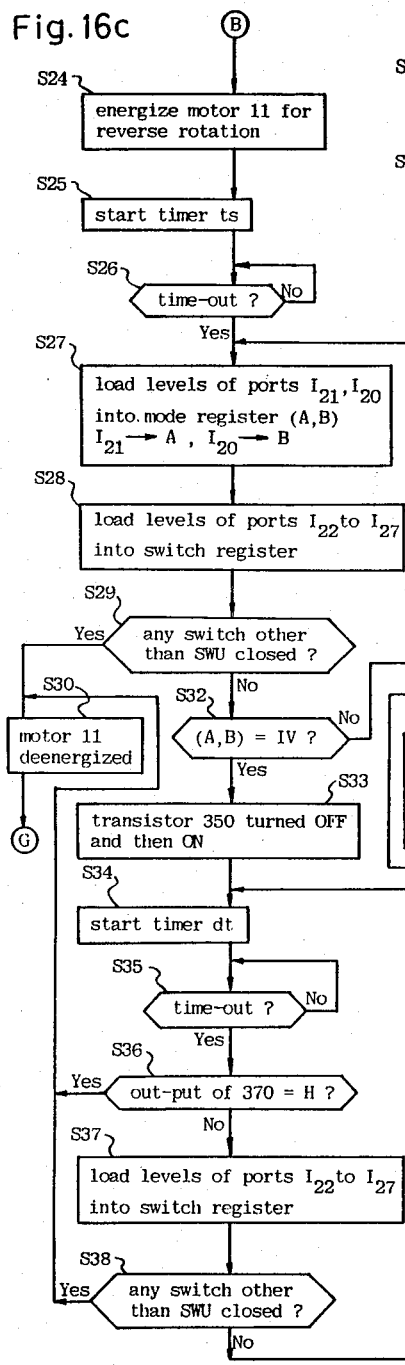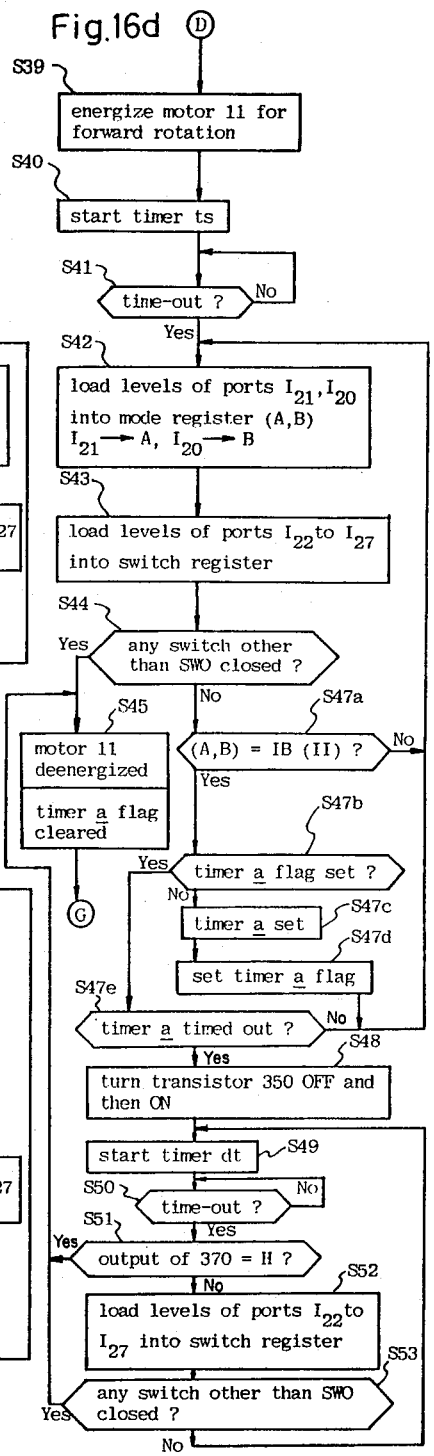
Fig.16c
Fig.16d

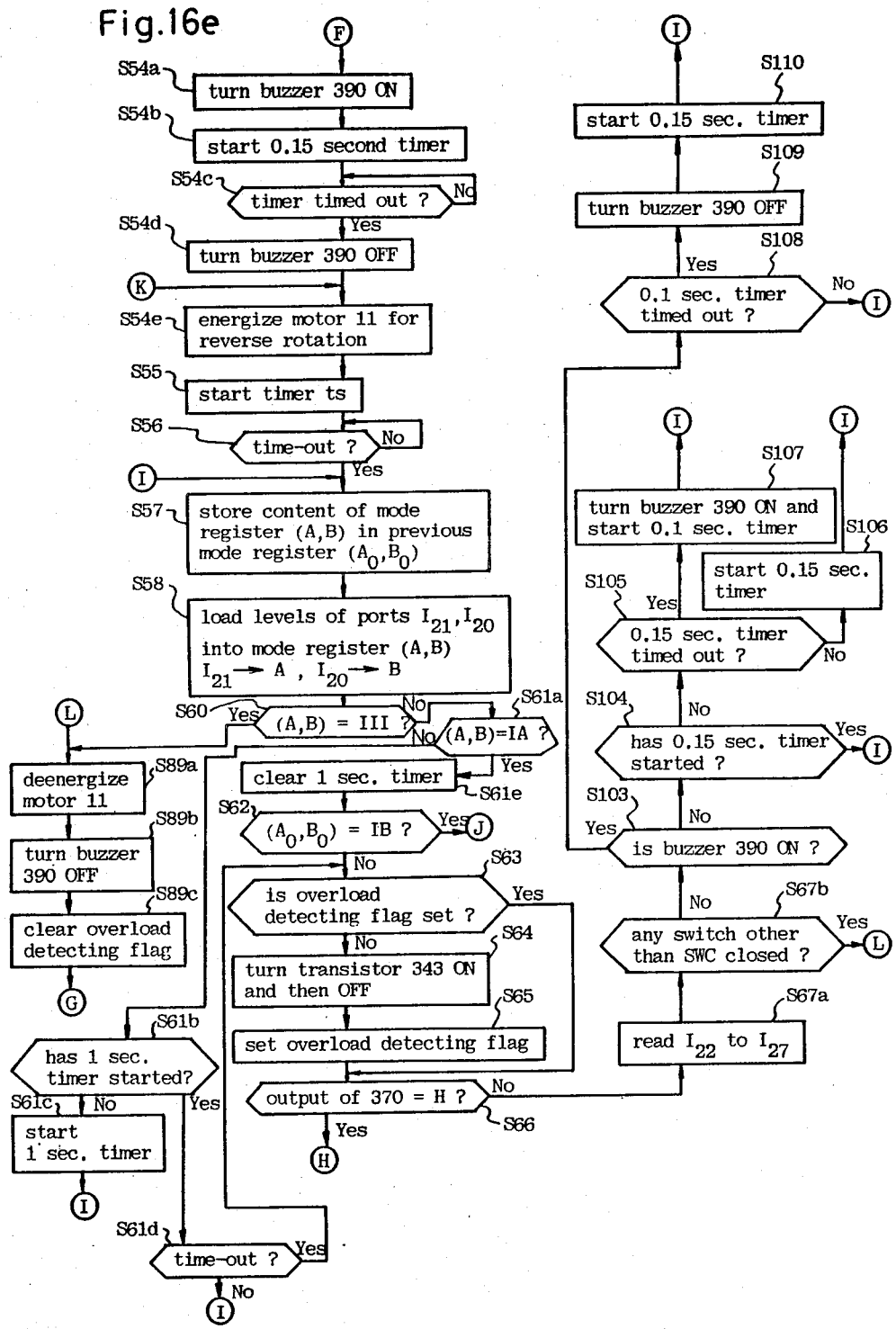

4,634,945

APPARATUS FOR AUTOMATICALLY OPENING AND CLOSING AN OPENING COVERING MEMBER

FIELD OF THE INVENTION

The invention relates to an apparatus for automatically opening and closing a light transmitting or non-transmitting plate, panel or the like (hereafter referred to as an opening covering member or closure panel) which covers the opening of a window, an access port or a roof opening by a switch operation, and more particularly, while not intended to be limited thereto, to an apparatus for automatically opening and closing a side window or a sun roof of an automobile.

BACKGROUND OF THE INVENTION

A preferred closure panel operating mechanism disclosed in U.S. Pat. No. 4,403,805 issued Sept. 13, 1983 to Arvin H. Strem et al., raises the closure panel vertically against a downwardly facing roof flange defining the roof opening so that a seal is compressed between the closure panel and the flange to provide a watertight occupant compartment. The closure panel can be tilted or slid for opening or closing by an automatic opening and closing apparatus which is activated by a switch operation of a vehicle driver.

A conventional drive and control unit for a vehicle sun roof or closure panel comprises a resistor which detects the temperature of a motor to sense a loading on the motor. The detected value is compared against an overload reference value so that the motor may be automatically stopped during an overload interval. Such a safety stop measure is relatively simple to achieve in a mechanism having a constant load. However, in a mechanism such as a sun roof mentioned above, when the sun roof is to be opened, it exhibits a high load until the leading end of the panel clears a weather strip, and the magnitude of the load is reduced when the panel clears the strip. Alternatively when the sun roof is to be closed, a link is raised to lift the trailing end of the panel, and as the leading end of the panel moves into contact with the weather strip, the load increases rapidly. In a mechanism including a deflector arm which is located at the front side of a window opening to be erected to drive a deflector when the panel is to be opened and which is collapsed by a panel drive mechanism to turn the deflector down when the panel is closed, a rapid increase in the load occurs when the arm is to be collapsed, and the load experiences a large variation during the normal operation.

Japanese Patent Application No. 131,812/1982, laid open No. 20726/1984, proposes an arrangement which prevents a malfunctioning in the presence of rapid changes in the load. Specifically, the full sliding stroke of a panel is divided into a plurality of sections in a manner to correspond to changes in the load. An overload reference value is previously established for each of the sections. Signal generating means is provided which generates an electrical signal in interlocked relationship with a motor drive mechanism which actually drives a panel, thus deriving a signal which corresponds to a position where the panel has moved as a result of sliding motion. The overload reference value is varied in response to the signal, and is compared against the actual motor load. This arrangement prevents a malfunctioning as a result of variation in the load since overload reference values can be selected in a manner corresponding to the load over the full sliding stroke of the panel.

However, during the full sliding stroke of the panel when the sun roof is to be closed, a portion of the stroke which is immediately preceding to the fully closed position, namely, from the time when the link is raised to lift the trailing end of the panel until the leading end of the panel moves into contact with the weather strip and the panel becomes fully closed by compressing the strip, produces a rapid change in the load. In particular, during the compression of the weather strip, the load increases to a very high value.

Because such stroke portion extends over a reduced distance, a difficulty is experienced in establishing a plurality of overload reference values. Accordingly, a mask interval is established for such stroke portion which deactivates an overload protective device in order to prevent a mistaken judgement that a rapidly increasing load may be misconstrued as a blockage to the full closing by an obstacle.

From the viewpoint of constructing a sun roof mechanism, there exists a small clearance between the leading end of the panel and the front edge of a sun roof opening during the stroke portion extending from a point which immediately precedes the full closure to the fully closed point. In the presence of an obstacle within the clearance, the full closure of the panel is prevented, presenting a high load on the motor. Such clearance may be required in the design of the mechanism, or cannot be removed entirely because of errors associated with the assembly of parts, or may be small enough in the design but may permit an obstacle to be present therein as a result of an assembly operation or a dimensional change occurring subsequent to the assembly.

SUMMARY OF THE INVENTION

It is an object of the invention to further reduce the possibility that a closure member for an opening may be prevented from being completely closed as a result of the presence of an obstacle or the like, applying an increased load upon a motor.

The above object is accomplished in accordance with the invention by an apparatus for automatically opening and closing a closure member for an opening, comprising an electric drive mechanism including an electric motor and an opening and closing mechanism responsive to the rotation of the electric motor in either forward or reverse direction for driving a closure member for opening and closing movement; means for detecting a load applied to the opening and closing mechanism; reference presetting means for presetting a reference value for an overload; means for detecting an overload by comparison of a load applied to the opening and closing mechanism against the reference value; a motor driver for energizing the electric motor for rotation in either forward or reverse direction; open/close command switch means for commanding an opening or a closing movement of the closure member; and open/close control means responsive to the switch means and the location of the closure member for commanding the motor driver to energize the electric motor for forward or reverse rotation or to stop the electric motor, the control means being also operable to command the motor driver to stop the electric motor when an overload is detected as the closure member is driven for its closing movement as a result of a signal from signal generating means, said signal generating means producing an electrical signal in accordance with the movement of the opening and closing mechanism, the apparatus also including alarm means and an alarm driver, the open/close control means determining the open or closed condition or the opening of the closure member on the basis of such electrical signal, the control means being operable to command the alarm driver to produce an alarm whenever the electric motor is driven for closing movement within a given range of opening.

As a result of the above arrangement, the alarm means is energized to give a warning to a driver or user whenever the closure member is driven for closing movement and enters the given range of opening from a widely open condition, or whenever the power is turned off when the closure member is located in the given range of opening and is subsequently turned on again and hence the closure member is again driven for closing movement, namely, whenever the signal generating means produces a signal indicating an opening within the given range and the motor is energized for driving the closure member for closing movement. By choosing a range of opening at this end, below which the presence of any obstacle may interfere with the sliding movement of the closure member to close the opening or which will permit any such obstacle to be readily removed, any interference with the sliding movement of the closure member can be previously eliminated. If no obstacle is present, the attention of the driver will be directed toward the movement of the closure member during the time it is being driven for closing movement, and this allows any interference with the sliding movement of the closure member to be prevented by assuring that such interference cannot occur subsequently.

In a preferred embodiment of the invention, the electric drive mechanism comprises an electric motor and an opening and closing mechanism which drives a closure member associated with an opening to tilt or to slide in response to the rotation of the electric motor in either forward or reverse direction. In this manner, both the sliding movement in either opening and closing direction and the tilting of a sun roof panel can be controlled with a single electric motor. The signal generating means comprises a disc-shaped switch actuator cam coupled to the electric drive mechanism for rotation with the rotation of the electric motor, the cam being formed with two sets of high and low portions in their peripheral surfaces, a first switch disposed in opposing relationship with one set of high and low portions of the cam to be operated thereby to assume an open or closed condition, and a second switch disposed in opposing relationship with the other set of high and low portions of the cam to be operated thereby to assume an open or closed condition. The open and closed conditions of these switches define four zones, one of which is allocated to given range of opening. The alarm means may comprise audible means such as buzzer either alone or may be combined with visible means such as light emitting element as required. The open/close control means is operable to command the motor driver to cause a pause or temporary stop of the electric motor and gives an alarm intermittently with a relatively long period whenever a mode defined by the combination of signals from the first and the second switch changes from the outside into the inside of the given range of opening during the time the closure member is being driven for closing movement. Subsequently the closing movement is re-initiated, and the control means causes an alarm to be given intermittently with a reduced period when the closure member is located within the given range of opening. If an overload is detected and the motor is stopped, the alarm is given in succession.

With the arrangement of the invention, the closure member is controlled to undergo four conditions of sliding open, sliding closed, tilting open and tilting closed, all of which can be detected by a compact switch actuator cam having a relatively reduced thickness. In an embodiment to be described later, the four conditions are defined as a mode IA which represents the given range of opening, a mode II corresponding to a zone which extends from a point immediately preceding the full closure to the full closure, a mode III corresponding to a zone from the full closure to the completion to a tilt down operation, and a mode IV corresponding to a zone from the completion of the tilt down operation to the completion of a tilt up operation. It will be seen that the combination of two switches provides only four mode signals, and accordingly, there can be defined no mode for openings which are greater than the given range. However, for these openings which are greater than any opening in the given range, there is no likelihood that any obstacle can interfere with the closing drive of the closure member, and thus there is no need to give an alarm. Accordingly, signals as used during the mode II are used for these openings. In this manner, a thin switch actuator cam having only two sets of high and low portions may be used to provide a control over the four modes including the sliding open and loosed operations and the tilting open and closed operations, and is also capable of providing a control in an additional mode, namely, a pause or temporary stop at a given value 10 cm short of full closure during the sliding closed operation, as will be further described later.

An alarm produced by the buzzer is repeated at a relatively reduced rate during the pause to draw the attention of a vehicle driver. However, as the closure member is driven again for closing movement, the alarm is repeated relatively rapidly to strain the driver, and when the motor is stopped in response to an overload, the alarm is produced in succession, clearly indicating the occurrence of an abnormal condition. This allows a vehicle driver to fully attend to the movement of the panel when it is being open or closed or when the movement is stopped in response to abnormality. The overall effect is that an interference with the sliding closed operation by an obstacle is prevented beforehand, or that any condition that is likely to cause an interference can be instantly remedied, thus enhancing the safety of the arrangement.

Other objects and features of the invention will become apparent from the following description of an embodiment thereof given in connection with the drawings.

BRIEF DESCRIPTION OF THE DRAWINGS

FIG. 1 is a perspective view generally showing the opening and closing mechanism for a sun roof panel which is mounted on the roof of an automobile;

FIGS. 2 and 3 are enlarged side elevations of a mechanism which supports the front portion of a panel, FIG. 2 illustrating the mechanism when the panel is fully closed and FIG. 3 showing the mechanism when it is slid open;

FIG. 5 is a cross section taken along the line IX—IX shown in FIG. 1, illustrating the panel fully closed;

FIG. 6 is a cross section taken along the line VI—VI shown in FIG. 4;

FIG. 12b is a cross section taken along the line XIIB—XIIB shown in FIG. 12a;

FIGS. 16a to 16f are series of flow charts illustrating a control operation by a microprocessor included in the electrical circuit of FIG. 15.

DESCRIPTION OF PREFERRED EMBODIMENTS

Figure 3:
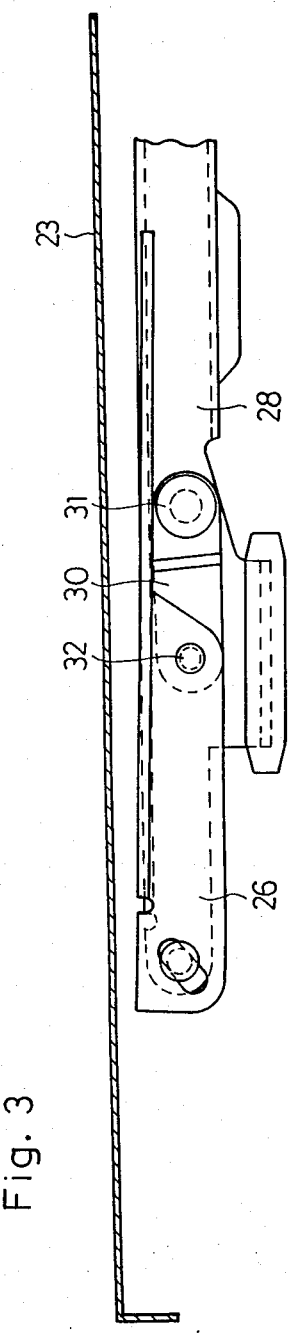

FIG. 1 generally shows an electric drive mechanism according to one embodiment of the invention. The mechanism is used to drive and control a panel 23 which opens or closes an opening 22 formed in a roof 21 of an automobile. The panel 23 opens or closes the opening 22 by a sliding movement and a tilting movement thereof. A pair of drive cables 24, 25 are connected to the panel 23 to operate it. The panel 23 is secured to brackets which are disposed along the opposite sides of the opening 22, only one bracket being shown in FIG. 1.

Referring to FIG. 2, adjacent to its leading edge, a bracket 26 is formed with an elongate slot 27 which extends downwardly toward the front of the automobile and which is engaged by a pin 28a fixedly mounted on a front guide 28. A front shoe 29 is attached to the bottom of the front guide 28, and a front link 30 has its one end pivotally mounted on a pin 31 secured to the front guide 28 so as to be rotatable thereabout while the other end of the link 30 is pivotally mounted on a pin 32 which is secured to the bracket 26.

Figure 4:
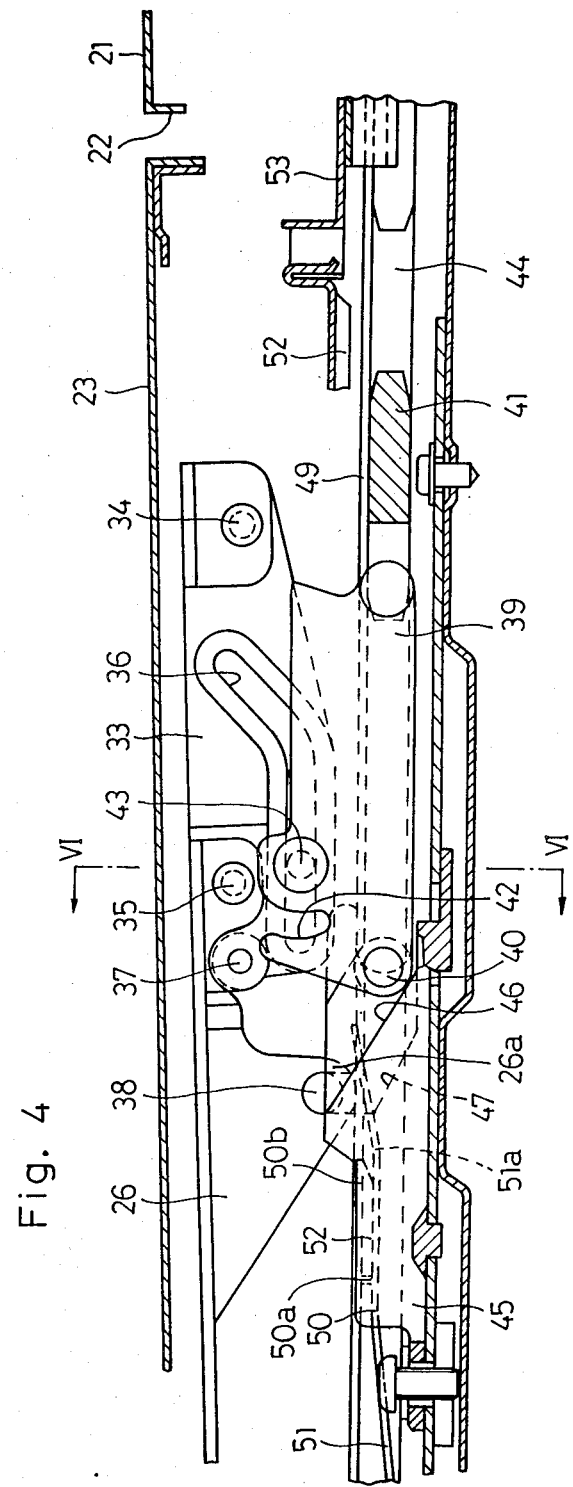
FIG. 4 is an enlarged side elevation of a mechanism which supports the rear portion of the panel.

Referring to FIG. 4, toward its trailing edge, the bracket 26 carries an engaging pin 38, and a plate 33 is fixed in position by a pair of anchorage pins 34, 35. The plate 33 is formed with a guide slot 36 therein which includes a horizontal portion located toward the front of the automobile and an inclined portion which extends upward from the rear end of the front portion towards the rear of the automobile. On its front end, the plate 33 fixedly carries a tilt pin 37. A link 39 rotatably carries a roller pin 40 at its front end and a rear shoe 41 at its rear end, and is also formed, in its top end, with an arcuate notched groove 42 which is centered about the front end of the guide slot 36 and which is engageable with the tilt pin 37 as well as a guide pin 43 on its top end which is engaged with the guide slot 36.

As shown in FIG. 5, the terminal ends of the drive cables 24, 25 are connected to the rear shoe 41. Accordingly, the movement in the fore and aft direction of the drive cables 24, is transmitted to the bracket 26 and thence to the front guide 28 through the rear shoe 41, the guide link 39, the guide pin 43 on the link 39 and the guide slot 36 which is engaged by the guide pin 43.

Referring to FIGS. 4 and 5, it will be seen that the front shoe 29 and the rear shoe 41 engage with and are guided by guide rails 44 which are disposed along the opposite sides of the roof opening 22. The guide rail 44 includes an inboard rail groove 44a which engages the foot 40a of the roller pin 40 for guiding purpose. The guide rail 44 also includes an outboard rail groove 44b which engages with an intermediate portion 38a of the engaging pin 38 for guiding purpose.

Referring to FIGS. 4 and 6, a block 45 is fixedly disposed within the guide rail 44, and is formed with an inclined groove 46 in its inboard side which guides the head 40b of the roller pin 40 on the link 39 and another inclined groove 47 in its outboard side which guides the head 38b of the engaging pin 38 which is fixedly mounted on the bracket 26. In the region of the block 45, flanges 48, 49 of the guide rail 44 are notched. Thus, as the guide link 39 moves forward, both the engaging pin 38 and the roller pin 40 are guided by the grooves 46, 47 to be raised in position and can be sequentially driven away from the rail groove 44b or 44a of the guide rail 44.

At its top end, the block 45 is formed with a flange 50 having a rectangular opening 50a and another flange 50b (see FIG. 4). The opening 50a is engaged by a stop 52 disposed on one end of a leaf spring 51 which has its other end secured to the front guide 28, during the closing movement and the tilting open operation of the panel 43. This interrupts a movement of the front guide 28 toward the front of the automobile. When the movable panel 23 is slid open, the front end 51a of the leaf spring 51 is held down by the lower end 26a of the bracket 26 so as to be slidable through the guide rail 44. Accordingly, as the engaging pin 38 moves upward within the inclined groove 47 formed in the block 45, the leaf spring 51 which has been held by the lower end 26a of the bracket 26 moves upward for engagement with the opening 50a in the block 45 (see FIG. 4).

Figure 7:
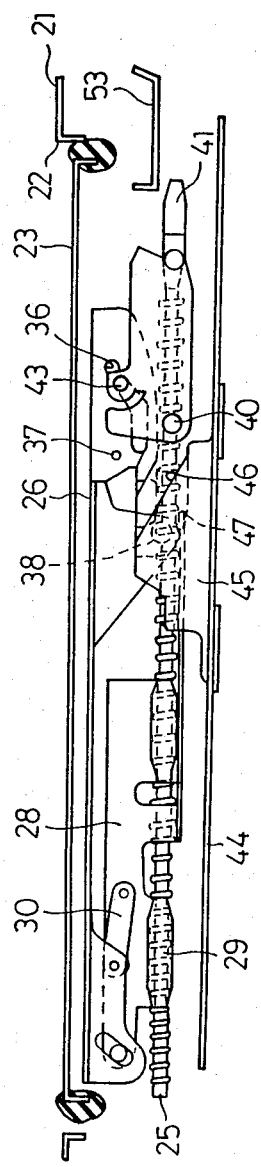
FIG. 7 is a cross section taken along the line IX—IX shown in FIG. 1, illustrating the panel which is slightly declined as a result of the sliding open operation.

The front guide 28 is associated with an arm 52, the rear end of which is connected to a rain trough 53. Consequently, the trough 53 normally slides together with the roof panel 23 so as to receive rain drops falling down from the trailing edge of the panel 23 in a perfect manner (see FIGS. 1, 4 and 7).

Figure 8:
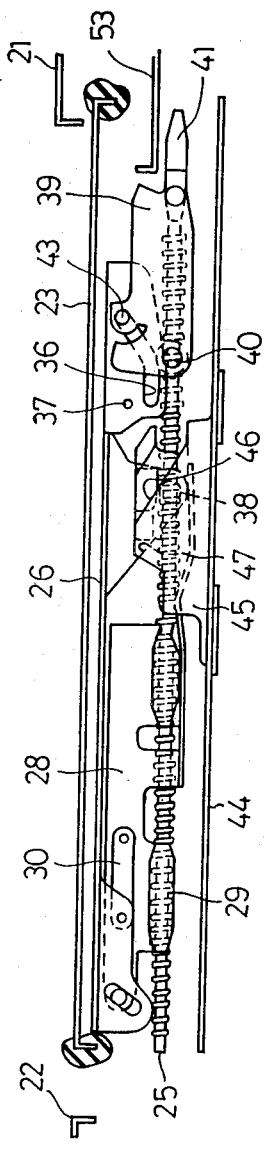
FIG. 8 is a cross section taken along the line IX—IX shown in FIG. 1, illustrating the panel which is slightly declined and further slid open relative to the position shown in FIG. 7.

In operation, the panel 23 normally closes the opening 22 as shown in FIG. 5. When the drive cable 25 is actuated to move the rear shoe 41 rearward of the automobile or to the right, as viewed in FIG. 5, the guide link 39 also moves back. The guide pin 43 is guided to move through the horizontal portion to the inclined portion of the guide slot 36 in the plate 33 as a result of its engagement therewith, whereby the panel 23 is pulled back through the plate 33 or the bracket 26, with its trailing edge driven downward. Hence, the engaging pin 38 secured to the bracket 26 moves down along the inclined groove 47 formed in the block 45, whereby the movable panel 23 moves down during its movement to the rear direction (see FIGS. 7 and 8). When fully closed, the pin 31 assumes a slightly lower position than the pin 32, as shown in FIGS. 2 and 5, but the front link 30 assumes a horizontal position shown in FIGS. 3 and 8 during the downward movement, whereby it becomes able to be received in the lower rear portion of the roof 21 of the automobile, thus opening the opening 22 by the sliding movement of the panel 23.

Figure 9:
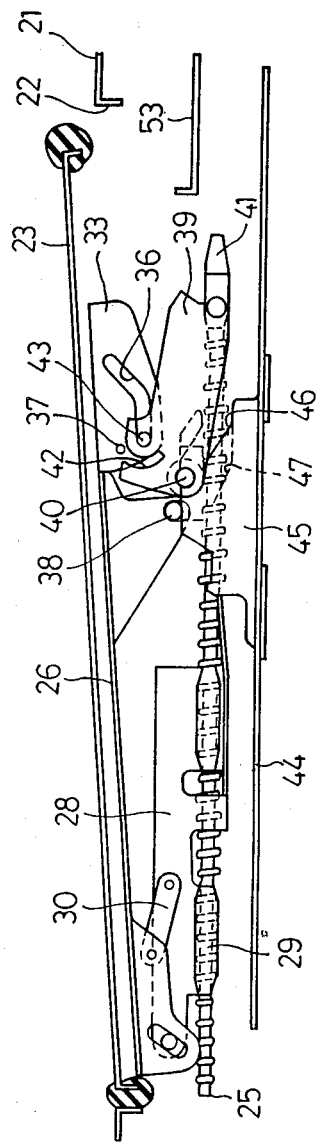
FIG. 9 is a cross section taken along the line IX—IX shown in FIG. 1, illustrating the panel which is slightly tilted up.

On the other hand, when the drive cable 25 is driven to move the rear shoe 41 forward from the position shown in FIG. 5 which represents a fully closed position, the guide pin 40b on the front end of the guide link 39 moves up along the inclined groove 46 formed in the block 45, whereby the guide link 39 moves angularly up during its forward movement (see FIG. 9). This permits the notched groove 42 in the guide link 39 to be engaged with the tilt pin 37 fixedly mounted on the plate 33. As the rear shoe 41 moves further forward, the guide link 39 moves angularly upward during its forward movement, causing the trailing edge of the panel 23 to be rotated upward, thus opening the opening 22 (see FIG. 10). Since the operation of the panel 23 takes place entirely through the bracket 26, once the panel 23 is assembled with the roof 21 of the automobile, the panel 23 is fitted into the opening 22, with the bracket 26 in its fully closed position as shown in FIG. 5, while flexing a weather strip of the panel, thereby allowing the panel to be assembled with and secured to the bracket 26.

Figure 10:
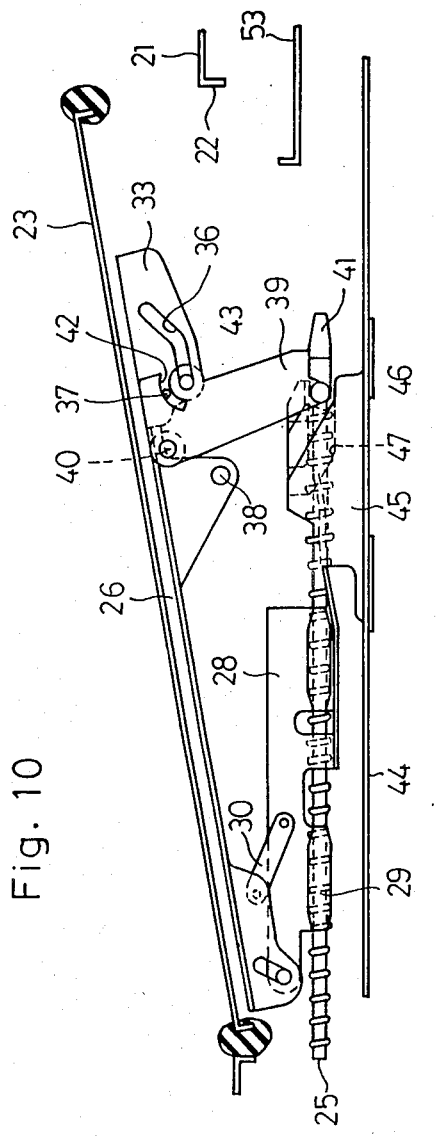
FIG. 10 is a cross section taken along the line IX—IX shown in FIG. 1, illustrating the panel which is completely tilted up.
Figure 11A:
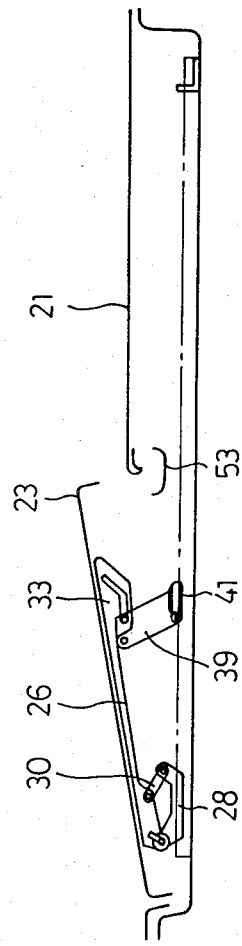
FIG. 11a is a side elevation generally illustrating the panel which is completely tilted up.
Figure 11B:
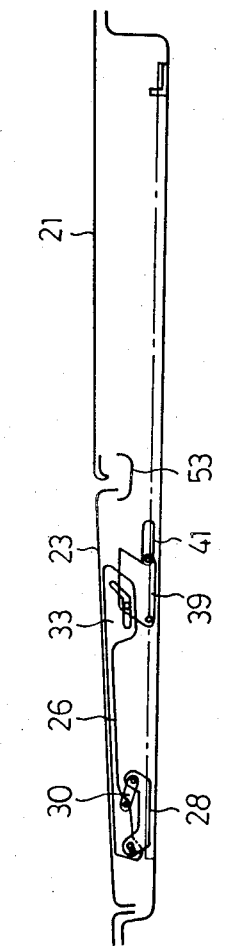
FIG. 11b is a schematic side elevation showing the panel which is fully closed.
Figure 11C:
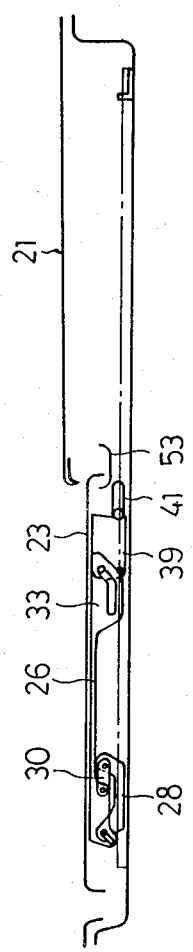
FIG. 11c is a schematic side elevation illustrating the panel which is declined to begin its sliding open operation.
Figure 11D:
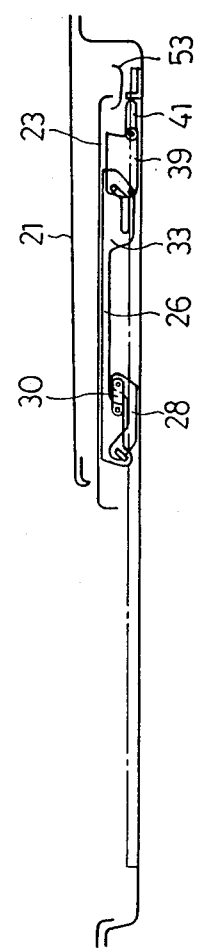
FIG. 11d is a schematic side elevation illustrating the panel which has slid to its fully open condition.

As the shoe 41 slides from its fully closed position shown in FIGS. 5 and 11b rearward of the automobile or to the right, as viewed in the drawings, the panel 23 moves down and slides to open the opening 22 (see FIG. 11c), and a further sliding movement of the panel achieves a fully open condition (FIG. 11d). When the shoe 41 is driven forwardly of the automobile or to the left, as viewed in the drawings, when the panel 23 assumes the fully open position, the panel progresses through the condition shown in FIG. 11c to reach the condition shown in FIG. 11b, thus closing the opening 22, with its weather strip on the leading edge closing the opening 22. When the shoe 41 is driven further forwardly or to the left, as viewed in the drawings, when the fully closed condition is achieved, the trailing end of the panel 23 is raised, thus achieving a tilt open condition (FIGS. 9, 10 and 11a). Conversely, when the shoe 41 is driven rearwardly of the automobile or to the right, as viewed in the drawings, when the tilt open condition (FIGS. 10 and 11a) is attained, the panel 23 is initially tilted closed to close the opening 22 completely (fully closed as shown in FIG. 11b), followed by the sliding open operation which ends with the full sliding open condition shown in FIG. 11d. If the shoe 41 is then driven forwardly of the automobile from this condition, the panel 23 reaches its fully closed position, followed by a raising of the trailing end of the panel 23 to achieve a fully tilt open condition.

It will be seen that a mere sliding movement of the shoe 41 back and forth causes the panel 23 to progress through its fully tilt open, partly tilt open, fully closed, partial sliding open and fully sliding open condition or conversely to progress through a fully slide open, partially slide open, fully closed, partially tilt open and a fully tilt open condition.

The cables 24, 25 which drive shoes (45) disposed on the opposite sides of a vehicle are coupled to a cable drive mechanism which essentially comprises a reduction gearing 9 and a motor 11. The cables 24, 25 are driven back and forth through the gearing 9 in mutually opposite directions in response to the forward or reverse rotation of the motor 11.

Figure 12B:
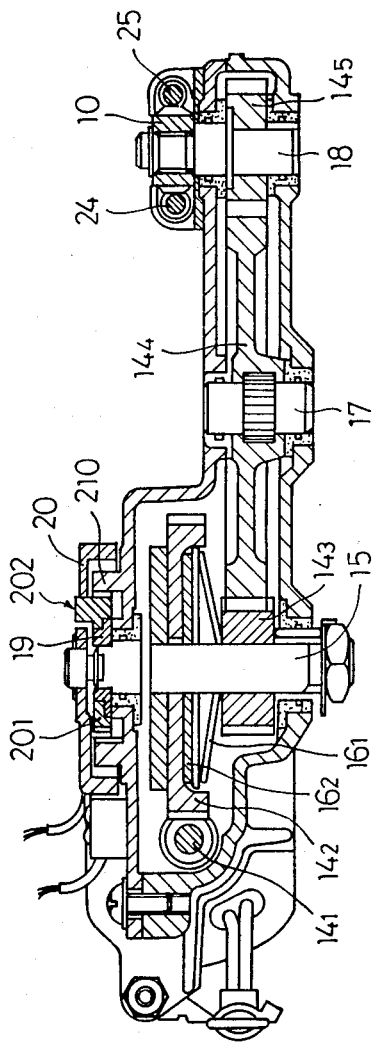
Figure 12A:
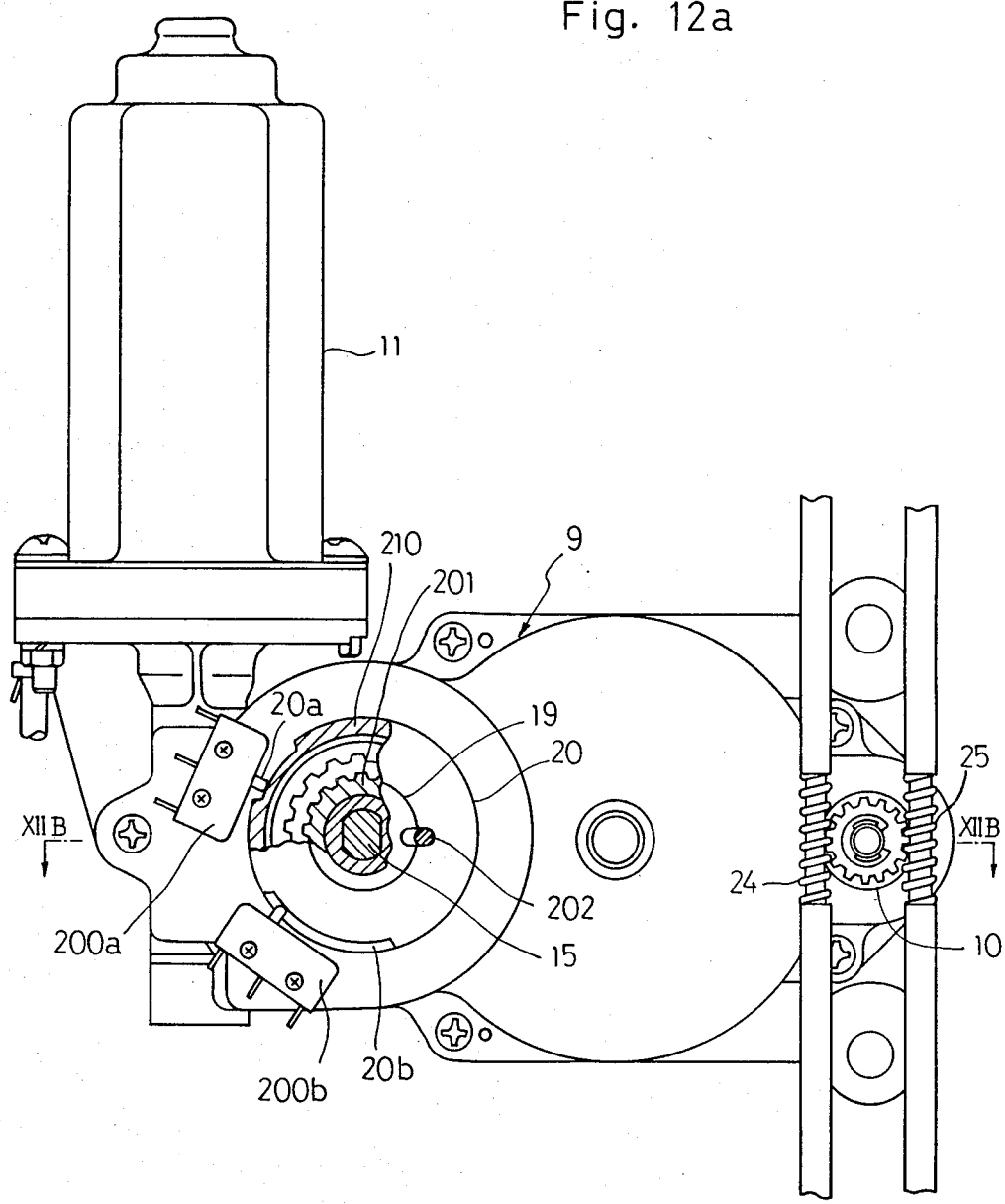
FIG. 12a is an enlarged plan view, partly broken away, of a cable drive mechanism.

The cable drive mechanism is shown in plan view in FIG. 12a and in cross section in FIG. 12b. The reduction gearing 9 comprises a gear train including a worm $14_1$ fixedly mounted on the rotary shaft of the motor 11, a worm wheel gear $14_2$ meshing with the worm $14_1$ and rotatably mounted on a rotary shaft 15, a gear $14_3$ fixedly mounted on the rotary shaft 15 and coupled to the gear $14_2$ through a friction clutch $16_2$ including a Belleville spring $16_1$, a gear $14_4$ meshing with the gear $14_3$ and rotatably mounted on a rotary shaft 17, a gear $14_5$ meshing with the gear $14_4$ and fixedly mounted on a rotary shaft 18, and a gear 10 fixedly mounted on the rotary shaft 18 and meshing with toothed cables 24, 25.

Figure 13:
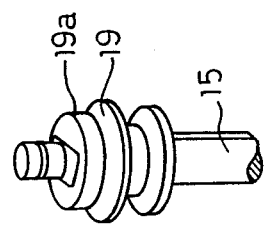
FIG. 13 is an exploded perspective view of a rotary shaft shown in FIG. 12b.

As shown in FIG. 13, an eccentric bearing 19 having an eccentric peripheral surface 19a is fitted over the free end of the rotary shaft 15, and a cam 20 is pivotally mounted on the peripheral surface 19a. The eccentric bearing 19 rotatably carries a planet gear 201 which in turn meshes with internal housing teeth 210. The planet gear 201 is formed with a pin 202. It is to be noted that the cam 20 is pivotally mounted on the extremity of the free end portion of the rotary shaft 15, and the cam 20 is formed with a groove extending therethrough which is engaged by the pin 202. As the rotary shaft 15 rotates, the bearing 19 rotates to cause the planet gear 201 to rotate differentially with respect to the internal teeth 210 by meshing engagement therewith, causing the pin 202 to move, which causes the cam 20 to rotate.

The peripheral surface of the cam 20 has an upper portion in which a single groove 20b is formed and also has a lower portion in which a single groove 20a is formed. A limit switch 200b is disposed in opposing relationship with the upper portion of the peripheral surface and a limit switch 200a is disposed in opposing relationship with the lower portion of the peripheral surface. In this embodiment, the position of the panel 23 is detected in four modes including a slide open condition (mode I), a slide closed condition (mode II) extending from a point immediately preceding the full closed position to the full closure, a tilt closed condition (mode III) extending from the completion of the tilt down operation to the full closure and a tilt open condition (mode IV). Specifically, the switches 200a and 200b are used to detect the degree of opening of the panel. It will be seen that a combination of the open or closed conditions of these switches is capable of representing only four conditions. A given range of opening is defined from a point immediately preceding the full closure of the panel 23 to a location which is about 10 cm spaced from such point in the opening direction of the panel. A mode IA is allocated to this range of opening so that such range can be uniquely determined from switch signals. Any opening (IB) greater than the given range (IA) of opening is represented by the same signals as used to represent the mode II. The reason for this choice will be more specifically described below.

As mentioned previously, the mode IA represents the given range of opening, and if the sliding movement in the closing direction should be prevented by the presence of an obstacle within this range of opening, there will be an increased load upon the motor, requiring the motor to be stopped rapidly. Accordingly, it is necessary that a buzzer be always energized whenever the motor is energized for the closing movement during the mode IA whatever an open/close control register, flags or timings may be, in order to direct the attention of a user. If a signal which is produced during the mode IA be similar to some other signal which is used during other modes, it is impossible to provide a unique determination that the operation in the mode IA is taking place. Accordingly, if a signal changes from one indicating the mode IB to some other signal during the closing movement of the panel or a signal changes from one indicating the mode II to some other signal during the opening movement of the panel, it is assumed that the mode IA is established, and a mode IA flag is set to indicate subsequently that the mode IA prevails. Nevertheless, if the key switch of the vehicle is turned off to disconnect the power supply associated with the drive and control system which is used to open or close the panel during the mode IA, the mode IA flag disappears. This presents a problem in that when the power is again turned on, a user is unable to determine that the mode IA prevails, and the buzzer fails to sound during the closing movement of the panel.

However, if a signal is allocated to the mode IA which permits such mode to be determined uniquely, the prevailing condition of the mode IA can be immediately noted from the signals from the limit switches 200a and 200b immediately upon the turning on of the power supply, and it is assured that the buzzer will sound whenever the panel is driven for its closing movement during this mode.

Figure 14:
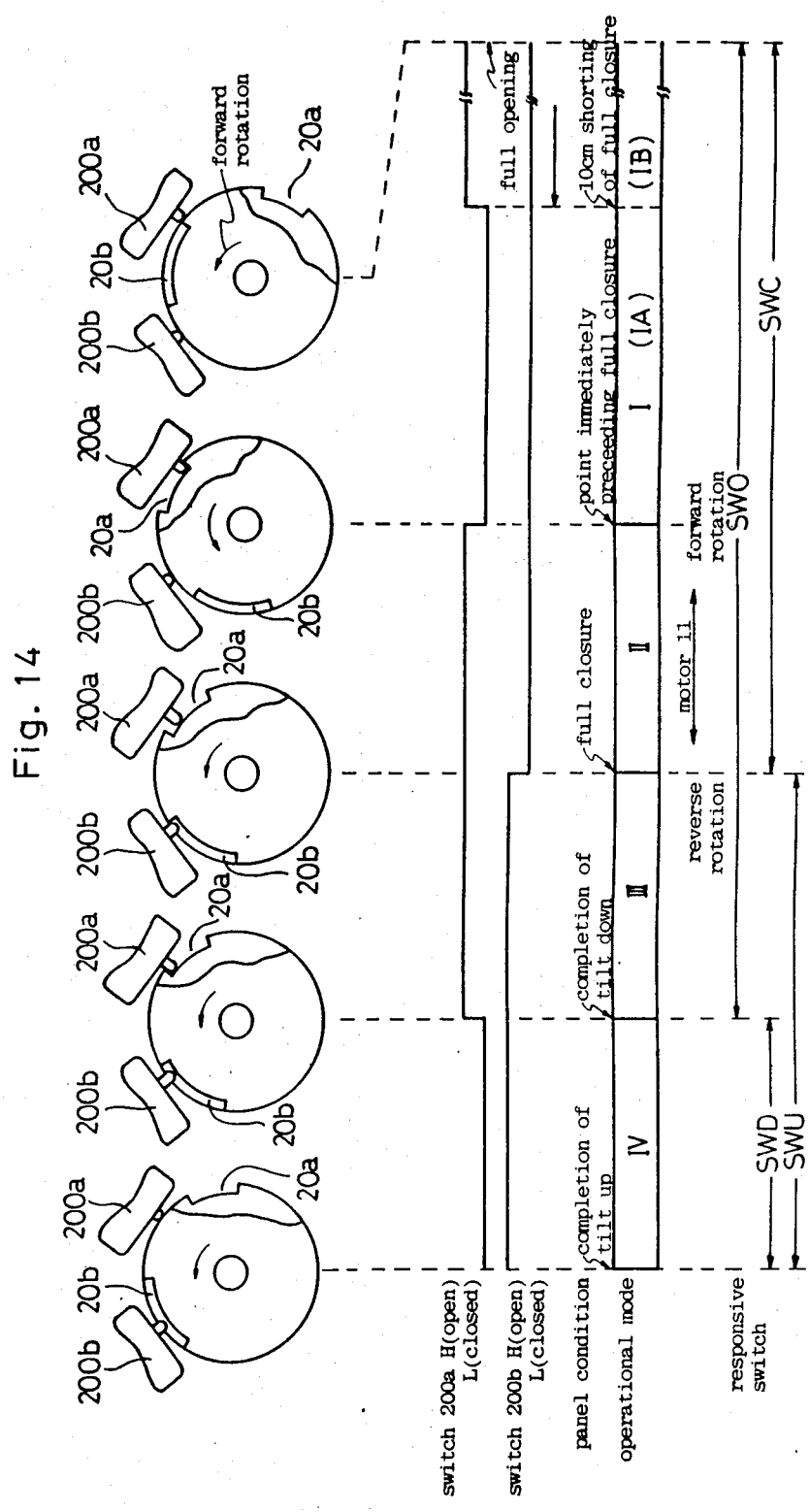
FIG. 14 is a series of illustrations showing the relationship between the cam and limit switches shown in FIGS. 12a and 12b when the panel is open and closed as well as the relationship between the rotation of the cam and the open or closed condition of the limit switches.

FIG. 14 schematically illustrates the relationship between the angle of rotation of the cam 20 on one hand and the open or closed conditions of the limit switches 200a, 200b as well as the operational mode of the panel control on the other hand. As mentioned previously, an area 1A of the mode I represents the given range of opening. From the initial condition representing the completion of the tilt up condition illustrated in the leftmost portion of FIG. 14, and corresponding to FIG. 11a, the cam 20 rotates counter-clockwise, as viewed in FIG. 14, in response to the forward rotation of the motor 11, operating the limit switches 200a and 200b on or off or open or closed as indicated in FIG. 14 as the panel 23 progresses through the completion of the tilt down operation, the full closure, a point immediately preceding the full closure, a point which is 10 cm short of the full closure and the full opening. Also from the initial position representing the full opening shown at the rightmost portion of FIG. 14 and corresponding to FIG. 11d, the cam 20 rotates clockwise, as viewed in FIG. 14, in response to the reverse rotation of the motor 11, and operates the limit switches 200a and 200b on and off or open and closed as indicated in FIG. 14 as the panel 23 progresses through a point which is 10 cm short of the full closure, a point immediately preceding the full closure, the full closure, the completion of the tilt down operation and the completion of the tilt up operation. In this embodiment, an overload is detected and the motor is stopped upon detection of such overload. The motor is temporarily stopped 10 cm short of the full closure position for safety purpose, which occurs during the mode I and when the panel 23 is driven for sliding movement from the full opening toward the full closure.

Again referring to FIGS. 12a and 12b, when either cable 24 or 25 is constrained with a force which exceeds a given value, the friction clutch $16_2$ slips, and the shaft 15 as well as the gear $14_3$ fixedly mounted thereon do not rotate even though the gear $14_2$ is driven for rotation by the motor 11. In this sense, the clutch $16_2$ serves as a mechanical safety mechanism.

Figure 15:
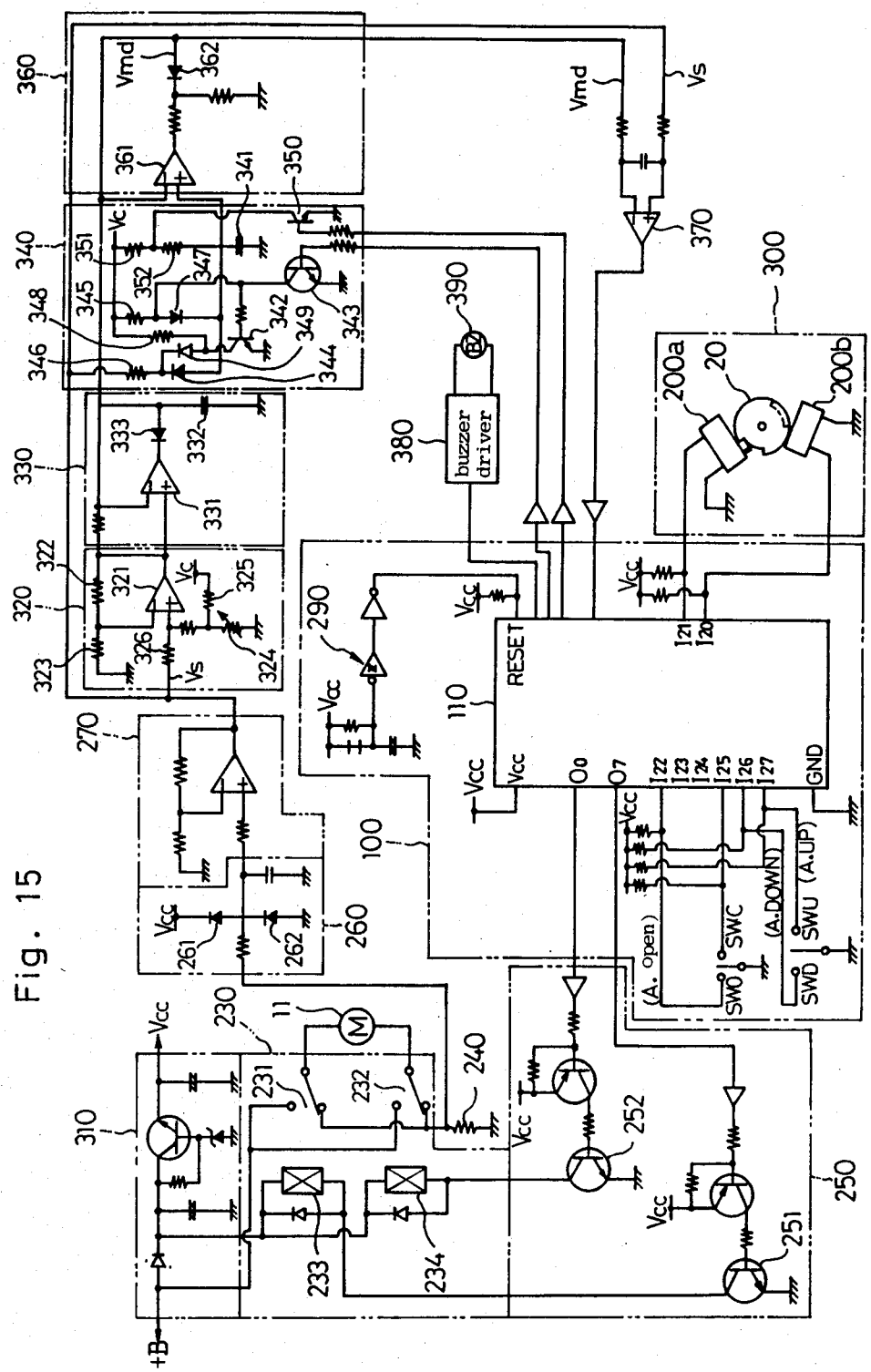
FIG. 15 is a circuit diagram of an electrical circuit which energizes the panel drive motor in response to mode signals from the limit switches and to the operation of open/close command switches.

FIG. 15 shows an electrical circuit which energizes the motor 11 for forward or reverse rotation and which controls the energization of the motor 11. In FIG. 15, the motor 11 has its one end connected to either supply voltage +12 V or the electrical ground defined by the chassis through a relay contact 231 of a motor driver 230 and its other end connected to either supply voltage +12 V or the electrical ground through a load detecting resistor 240 and a relay contact 232. The relay contacts 231 and 232 are operated by relay coils 233, 234, respectively. The coils 233 and 234 are connected to drive transistors 251 and 252, respectively, of a relay drive circuit 250. As will be described later, the drive circuit 250 is connected to output ports 00 and 07 of a microprocessor 110 which is part of an electrical control unit 100.

When the transistor 251 is turned on, the relay coil 233 is energized, and a relay contact 231 is thrown into contact with the supply voltage +12 V, thus completing a current path through the supply voltage +12 , contact 231, motor 11, contact 232 resistor 240 and the electrical ground, thus energizing the motor 11 for forward rotation to open the sun roof panel 23. When the transistor 252 is turned on, the relay coil 234 is energized, whereby the relay contact 232 is thrown into contact with the supply voltage +12 V, establishing a current path through the supply voltage +12 V, contact 232, motor 11, contact 231, resistor 240 and the electrical ground to energize the motor 11 for reverse rotation in order to close the panel 23.

A constant voltage circuit 310 supplies a constant voltage Vcc to various parts of the circuit.

A filter circuit 260 is provided in order to eliminate fluctuations of high frequency components appearing in the voltage representing the load upon the motor or the voltage drop across the resistor 240. In addition to filter elements such as resistors and capacitors, it includes diodes 261 and 262 which operate to limit an input voltage exceeding the voltage level Vcc to the level Vcc+Vr (where Vr represents the forward voltage drop across a diode) and to limit an input voltage which is lower than the ground potential to −Vr for protecting subsequent operational amplifiers.

An amplifier circuit 270 amplifies an output from the filter circuit 260 to a necessary level. An output Vs from the amplifier 270 is treated as a load detecting voltage.

A summer 320 operates to sum the load detecting voltage with a voltage which represents a permissible level, with the sum voltage being adjusted by means of a variable resistor 324.

A delay circuit 330 delays the sum output. To reduce a difference in the sensitivity to the rising and the falling edge of the sum output, a delay is applied to only the rising edge while such delay is prevented from being applied to the falling edge. At this end, the delay circuit 330 includes a capacitor 332 connected to a diode 333, which is optimized by an operational amplifier 331 which compensates for a forward voltage drop across the diode 333.

A storage circuit 340 functions to divide a difference Vcc−Vs between the load detecting voltage Vs and the constant voltage Vcc by means of a voltage divider formed by resistors 345 and 346, with the divided voltage being applied to a storage capacitor 341. During the closing movement of the panel 23, a transistor 343 is turned off for a given time interval ts from the beginning of the closing movement, and accordingly, a transistor 342 is turned on. After the lapse of the given time interval, the transistor 343 is turned on while the transistor 342 is turned off, whereby the constant voltage Vcc is applied to the cathode of a diode 344 through a combination of a resistor 348 and a diode 349, thus back biasing the diode 344 for cutoff. The capacitor 341 holds the divided voltage of Vcc−Vs which has been applied thereto immediately before the cutoff. In the present embodiment, the full opening achieved by the sliding movement and the completion of the tilt up operation are detected in the form of an excessive increase in the load current through the motor 11. Reference value which is used during such detection is established by resistors 351, 352 and a transistor 350. During the forward rotation of the motor to open the panel in the mode I and during the reverse rotation of the motor to effect a tilt up operation in the mode IV, the transistor 350 is turned off, whereby a voltage corresponding to Vs and which is higher than the divided voltage formed from Vcc−Vs by means of the voltage dividers 345, 346 is applied to the capacitor 341 through a combination of resistors 351, 352. The turn-on and -off of the transistors 343, 350 are controlled by the microprocessor 110.

A level check circuit 360 compares a delayed output from the delay circuit 330 against an output from the storage circuit 340 and outputs whichever voltage having a lower value. It includes an operational amplifier 361 having an inverting input to which the delayed output is applied and a non-inverting input to which the stored output is applied.

When the stored output has a magnitude greater than that of the delayed output, the amplifier 361 produces a positive output which is blocked by a diode 362. In this manner, the delayed output is fed to a subsequent comparator 370. When the stored output is less than the delayed output, the amplifier 361 produces a negative output, whereby the delayed output passes through the diode 362 to the output of the amplifier 361, whereby the delayed output is lowered to the level of the stored voltage. The voltage prevailing at the anode of the diode 362, equivalent to either the stored voltage or the delayed voltage whichever is the lower, represents an overload reference voltage Vmd, which is applied to the following comparator 370.

The comparator 370 compares an output from the level check circuit 360 or the overload reference voltage Vmd against the load detecting voltage Vs, and produces a low level signal "0" representing the normality whenever Vs is less than Vmd and a high level signal "1" representing an abnormality when Vs is greater than Vmd for output to the microprocessor 110.

A power on reset circuit 290 is connected to a reset terminal of the microprocessor 110 to reset it whenever the power supply to the various circuits are turned on.

The microprocessor 110 includes input ports I22 to I27 which are connected to open/close command means for the panel 23, including a tilt down command switch SWD, a tilt up command switch SWU, a full slide open command switch SWO and a full slide closed command switch SWC. It is to be understood that each of these switches remains closed only while it is being depressed and returns to its open condition whenever it is released. The significance of the closure of each of these switches is tabulated in Table 1 below. The microprocessor 110 senses or reads the open or closed condition of these switches in a manner which is determined by the particular mode.

TABLE 1

| Switch | Designation | Significance of Switch Closure |
|--------|-------------|-------------------------------|
| SWO | automatic full slide open command switch | temporary closure commands full slide open operation, responsive only to modes I to III |
| SWC | automatic full slide closed command switch | temporary closure commands a full sliding closed operation, responsive only to modes I and II |
| SWU | tilt up command switch | temporary closure initiates the opening drive until the completion of the tilt up operation, responsive only to modes III and IV |
| SWD | tilt down command swtich | temporary closure causes the closing drive until the full closure is achieved, responsive only to mode IV |

The interval during which the open or closed condition of the respective switches are read are indicated in FIG. 14. In FIG. 14, any interval which is not covered by a particular switch designation indicates the absence of a reading operation. Accordingly, if that switch is operated, a corresponding panel drive is not initiated.

The microprocessor 110 also includes input ports I20 to I21 which are connected to the limit switches 200a, 200b, respectively, of a panel position detector 300. Both of these limit switches 200a, 200b are of normally open type, and when one of these switches is closed, it feeds an L level signal to its associated input port and feeds an H level signal whenever that switch is open.

A buzzer driver 380 is connected to an output port, not designated, of the microprocessor 110 and energizes a buzzer 390 for sounding at an audible frequency whenever the microprocessor 110 supplies an alarm command signal thereto. The buzzer 390 represents alarm means in this embodiment.

The microprocessor 110 has an internal ROM which stores a plurality of programs illustrated in FIGS. 16a to 16f which are used to control the sliding movement and the tilting open or closed operation of the panel 23. Control operations performed by the microprocessor 110 will now be described with reference to the flow charts shown in FIGS. 16a to 16f.

Figure 16A:
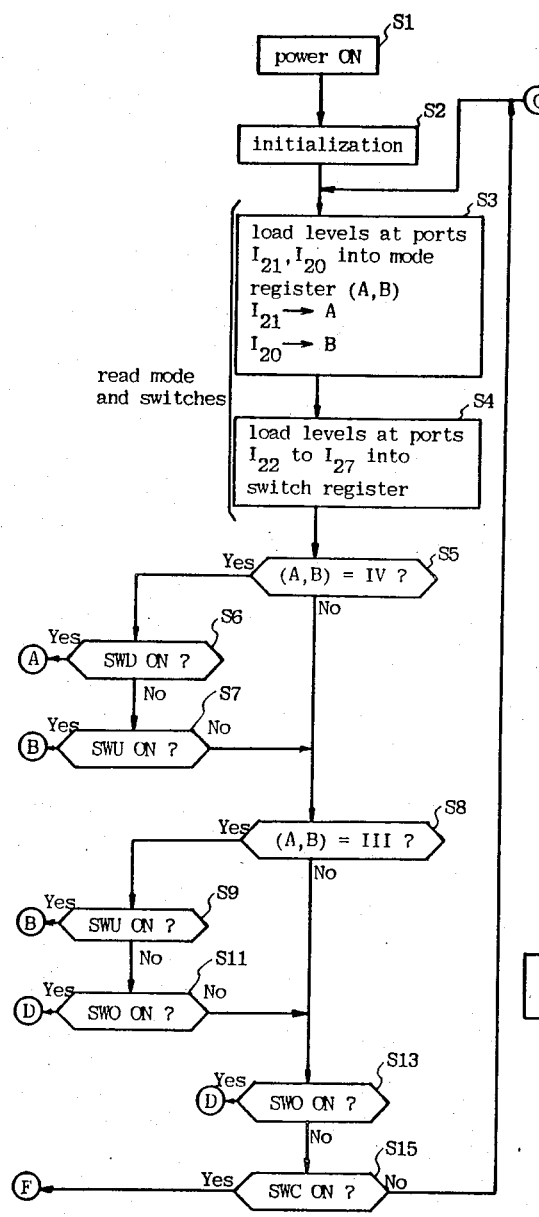

Initially referring to FIG. 16a, when the power supply is turned on (S1), internal registers, flags, timers (program timers) and the like of the microprocessor 110 are initialized or set to their content which represent a standby condition, and input/output ports are also initialized. This means that these ports are set to their content representing a standby condition, the motor 11 is deenergized and a reading operation of input ports is enabled. This is indicated by an initialization step S2. In step S3, the microprocessor 110 then reads signal levels (either H or L) of the input ports I21 and I20, and loads or stores such signals into mode registers [A, B]. The symbol [A, B] schematically represents data indicative of a mode as illustrated in FIG. 14, with A representing the signal level of the input port I21 and B the signal level of the input port I20.

In the next step S4, the microprocessor 110 reads the levels at the input ports I22 to I27, loading or storing such levels into a corresponding switch register. If all the significant six bits of this register are H's, it means that none of the switches are operated (Table 1). If any one of the bits is L, a switch connected to an input I2i corresponding to that bit is closed.

It will be seen that the steps S3 and S4 have stored mode data indicated by the open or closed conditions of the limit switches 200a, 200b in the mode register [A, B] and panel open/close command data in the switch register.

Depending on the content of the mode register [A, B] and the switch register, the microprocessor 110 proceeds to control the following operations:

A. The tilt down operation illustrated in FIG. 16b when the mode IV prevails and the switch SWD is closed;

B. The tilt up operation illustrated in FIG. 16c when either mode IV or III prevails and the switch SWU is closed;

C. The full slide open operation illustrated in FIG. 16d when either one of the modes III to I prevails and the switch SWO is closed; and D. The full sliding closed operation illustrated in FIGS. 16e and 16f when one of the modes II or I prevails and the switch SWC is closed.

If none of the switches is closed, the microprocessor returns to the step S3. This explains the steps S5 to S15 shown in FIG. 16a.

Figure 16B:
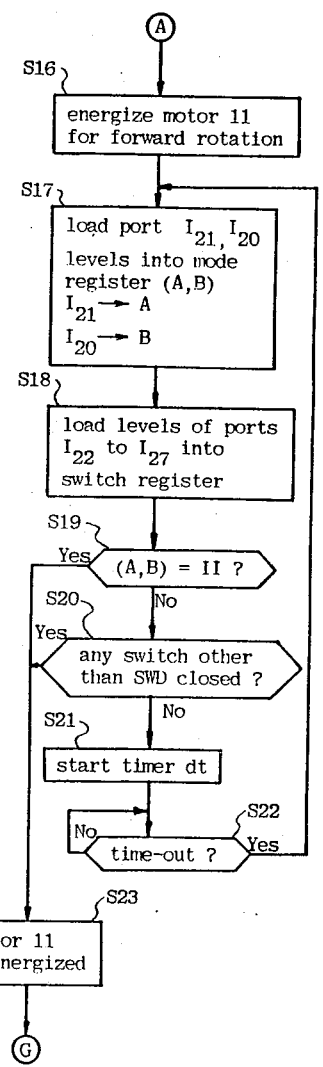

Referring to FIG. 16b, the control of the tilt down operation will be described. When the microprocessor 110 proceeds to the control of the tilt down operation, it initially commands the transistor circuit 250 of the motor driver to energize the motor 11 for forward rotation (step S16). This is achieved by establishing an H level at the output port O0 and an L level at the output port O7. Since a reading of the tilt down command takes place only during the mode IV, the forward rotation of the motor 11 drives the panel 23 from the tilt open condition to the completion of the tilt down operation and then toward the full closure. It will be seen that the termination of the tilt down operation has brought the panel to its fully closed condition, which means a transfer point from the mode III to mode II. The subsequent step S17 reads the open or closed condition of the limit switches 200a, 200b, loading the mode data into the mode register. The step S18 reads the conditions of the open/close command switches (Table 1), loading such data into the switch register. The content of these registers is read, and if the mode II is not established or other switches are not closed, a timer dt (program timer) is started. The program then waits for it to time out, whereupon the program again returns to the step S17. During the forward rotation of the motor 11, this looping operation is repeated until the mode II is established. When the mode II is established, the microprocessor 110 commands the transistor circuit 250 to stop the motor 11, by establishing an H level at both output ports O0 and O7 during the step S23, and then returns to the step S3 shown in FIG. 16a.

When the switch SWD is closed temporarily with the panel 23 tilted open as a result of the described control of the tilt down operation, the motor 11 is energized for forward rotation until the panel 23 is fully closed, whereupon it is deenergized. If other switch becomes closed before the panel 23 is fully closed, such condition is read at a step S17, and the program skips from the step S20 to the step S23 where the motor 11 comes to a stop. The control of the microprocessor 110 then returns to the step S3. In the step S3, any switch which may have been closed anew is read, and a corresponding control is performed. However, in the mode IV, a response is enabled only to the closure of the switch SWU among the switches other than the switch SWD, and hence if the switch which is closed anew is not the switch SWU, the motor 11 remains at rest.

Referring to FIG. 16c, the control of the tilt up operation will be described. When proceeding to the control of the tilt up operation, the microprocessor initially commands the transistor circuit 250 of the motor driver to energize the motor 11 for reverse rotation (step S24). This is accomplished by delivering an L level at output port O0 and an H level at output port O7.

The command for the tilt up operation is read only during the modes IV and III. The reverse rotation of the motor 11 drives the panel 23 toward its fully tilt open condition (the completion of the tilt up operation shown in FIG. 11a). The control of the tilt up operation terminates when an overload of the motor occurs during the mode IV. However, if a starting current having an excessive magnitude flows through the motor 11 during the starting phase thereof and such current is detected as an overload, this prevents the motor from being driven. Accordingly, the microprocessor 110 starts a timer ts at step S25, and upon its time-out (step S26), the open or closed condition of the limit switches 200a, 200b are read at step S27 and such mode data [A, B] is stored. At step S28, the open/close command switches are read and corresponding signals are fed to the input ports I22 to I27, which inputs are stored in the switch register.

It is to be noted that the duration of the timer ts is equal to a time period which is required for the starting current to settle down plus a marginal value. Upon its time-out, the motor 11 completes its starting phase and the motor current settles down to a low value.

At step 29, the microprocessor 110 then reads the content of the switch register to determine if any switch other than the switch SWU is closed. If the answer is YES, indicating that some switch other than the switch SWU is closed, it provides an output at step S30 which causes the motor 11 to be deenergized. The program then returns to the step S3.

If the answer is NO, indicating that switches other than the switch SWU are open, it is determined at step S32 if the content of the mode register [A, B] indicates that the mode IV is established, and if the mode IV is not established, the program returns to the step S27 since there is no need to detect the completion of the tilt up operation. The motor 11 thus continues to be energized for reverse rotation, and a reading of the mode and the open/close command switch is repeated. If the mode IV is established, the microprocessor delivers a signal at a step S33 which turns the transistor 350 off, and then provides a signal which turns it on. This allows the transistor 350 to be turned off once, and the capacitor 341 in the storage circuit 340 is charged to substantially Vcc during the off interval, and the amplifier 361 produces an output of H level, whereby the voltage Vmd assumes a high value. When the transistor 350 resumes its on condition, the microprocessor 110 starts a timer dt at step S34. Upon time-out (S35), the microprocessor derives an output from the comparator 370 for reference purpose at S37.

It is to be noted that the comparator 370 produces an output of H level indicating an overload if the motor voltage Vs exceeds the reference value Vmd, and produces an output of L level if the reference value is not exceeded. When the comparator 370 produces an output of H level, this means that the tilt up operation of the panel 23 is completed. If the output of the comparator 370 is not at its H level indicating that the tilt up operation is not yet completed, the microprocessor 110 reads the open/close command switch at step S37, and senses if other switches than the switch SWU is closed at step S38. If any switch other than the switch SWU is closed, the program proceeds to the step S30 where the motor 11 is deenergized. Otherwise the microprocessor returns to starting the timer dt at step S34. Subsequently, it waits for the time-out of the timer dt (S35) and derives an output from the comparator 370 for reference purpose (S38). When the output from the comparator 370 changes to its H level, the microprocessor proceeds to deenergizing the motor 11 at step S30. It will be appreciated that the duration of the timer dt also represents a sampling period to detect an overload or the completion of the tilt up operation and to read the condition of the open/close command switch.

During the control of the tilt up operation, if the tilt up command switch is temporarily closed during the mode IV or III, the motor 11 is energized for reverse rotation and continues to be energized for reverse rotation until any switch other than the switch SWU is closed or the tilt up operation of the panel 23 is completed.

Referring to FIG. 16d, the control of the full slide open operation will be described. When controlling the full slide open operation, the microprocessor 110 initially commands the transistor circuit 250 of the motor driver to energize the motor 11 for forward rotation at step S29, by establishing an H level and an L level at the output ports O0 and O7, respectively.

The command for slide open operation is read only during the modes III to I. The forward rotation of the motor 11 drives the panel 23 for sliding movement toward its fully open position (see FIG. 11b). The control of the full slide open operation terminates when an overload of the motor is detected during the mode I or more exactly during the mode IB. To avoid a situation that a starting current flowing through the motor 11 has an excessive magnitude and is detected as an overload to prevent the motor from being driven, the microprocessor 110 starts a timer ts at step S40. Upon time-out (step S41), the microprocessor 110 reads the open or closed conditions of the limit switches 200a, 200b at step S42 to store the mode data [A, B], and reads the open/close command switch at step S43 to store the conditions of the input ports I22 to I27 in the switch register.

The microprocessor 110 then reads the content of the switch register to determine if any switch other than the switch SWO is closed at step S44. If the answer is YES, indicating that some switch other than the switch SWO is closed, it delivers an output which causes the motor 11 to be deenergized at step S45, and then returns to the step S3.

If the answer is NO, indicating that other switch than the switch SWO are open, the microprocessor makes reference to the content of the mode register [A, B] to determine if the mode IB (or mode II may also be possible) is established at step S47a. If it is determined that the mode established is mode III or IA, this means that the panel has not reached its fully open position, and hence the program returns to the step S42. If the mode IB is established, even though the mode II is also possible, the microprocessor refers to a timer a flag at step S47b to determine whether such flag is set. If not, the microprocessor starts a timer a at step S47c, sets the timer a flag at step S47d and then returns to the step S43. It is to be noted that the duration of the timer a is slightly longer than the maximum time interval during which the panel may be driven during the mode II. Accordingly, if the mode II is established, the time-out of the timer a indicates that the mode II has been passed. During the mode IB, this mode is still maintained if the timer a times out, the program proceeds through step S42 and subsequent steps, and if the timer a times out at step S47e, indicating that the time duration a has passed since the mode IB is entered, the program then proceeds to a next step S48. At step S48, the microprocessor delivers a signal which turns the transistor 350 off and then delivers a signal which turns it on. This temporarily turns the transistor 350 off, whereby the capacitor 341 in the storage circuit 340 is temporarily charged substantially to the level of Vcc, and the amplifier 361 produces an output of H level, whereby the reference voltage Vmd assumes a high value. When the transistor 350 resumes its on condition, the microprocessor starts a timer having a time duration of dt at step S49. Upon time-out (S50), the microprocessor refers to an output from the comparator 370 at step S51.

The comparator 370 produces an output of H level indicating an overload if the motor voltage Vs exceeds the reference value Vmd and produces an output of L level if the reference value is not exceeded. When the comparator 370 produces an output of H level, the panel 23 is fully open as a result of the sliding movement (see FIG. 11d). Since the panel is not fully open if the output from the comparator 370 does not have an H level, the microprocessor 110 reads the condition of the open/close command switch at step S52 and also senses whether or not any switch other than the switch SWO is closed at step S53. If some switch other than the switch SWO is closed, the microprocessor proceeds to deenergizing the motor 11 at atep S45 and clearing the timer a flag. Otherwise, it returns to starting the timer dt at step S49. The program then waits for the time-out of the timer dt (S50), and the microprocessor refers to an output from the comparator 370 at step S51. When the output of the comparator 370 reaches its H level, the microprocessor proceeds to deenergizing the motor 11 at step S45.

When the full slide open command switch SWO is closed during the mode III to I as a result of the control of the full slide open operation mentioned above, the motor 11 is energized for forward rotation, and the motor 11 is deenergized when any switch other than the switch SWO is closed or when the panel 23 reaches its fully open position (FIG. 11d) as a result of its sliding movement.

Figure 16F:
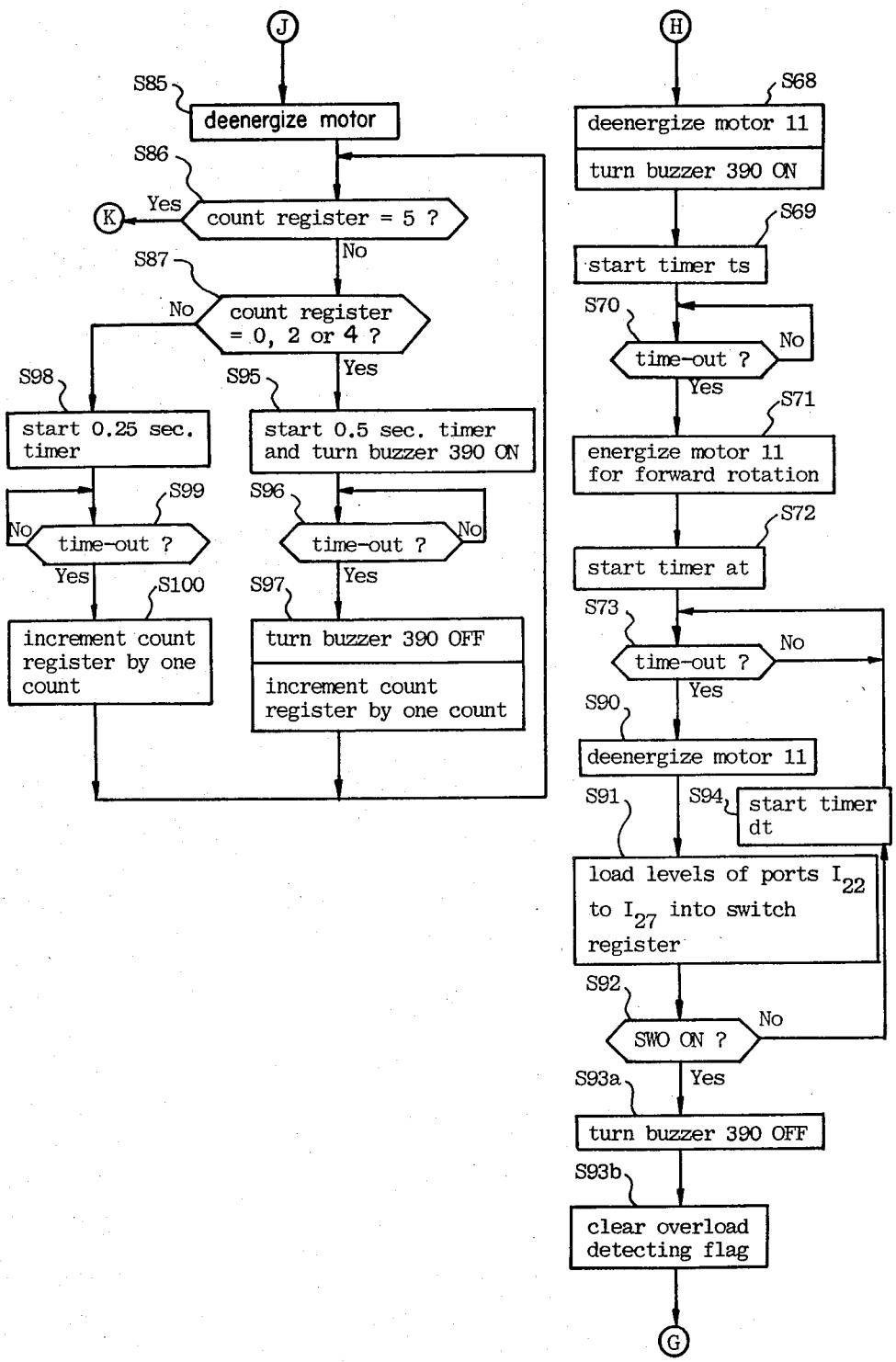

Referring to FIGS. 16e and 16f, the control of a full slide closed operation will be described. It will be appreciated that when the panel 23 is driven for a sliding movement in the closing direction, such movement may be interfered with by the presence of an obstacle. To prevent such interference, a load is detected when the panel is driven for closing movement during the modes IB and IA, and in the event an overload is detected, the panel 23 is stopped temporarily, and the buzzer 390 is energized for sounding. Immediately, the panel 23 is driven in the reverse or opening direction for a reduced stroke, followed by a complete stop of the panel. This constitutes a safety stop. Also a preliminary stop takes place in which the panel 23 is temporarily stopped for 2 seconds at an opening which leaves a space on the order of 10 cm before the panel 23 reaches its fully closed position (FIG. 11b), namely, when the mode changes from IB to IA which corresponds to the given range of opening. During the time the panel 23 is temporarily stopped, the buzzer 390 is intermittently sounded with a period of 0.5 second, following its deenergization during the next 0.25 second, further followed by sounding the buzzer for another 0.5 second, and then the sliding movement in the closing direction is re-intiated. When the sliding movement in the closing direction is re-initiated subsequent to the preliminary stop, the buzzer is intermittently energized with a reduced period since then the mode IA (the given range of opening) is established.

When entering the control of the slide closed operation, the microprocessor 110 initially energizes the buzzer 390 at step S54a, starts 0.5 sec timer at step S54b, and turns the buzzer 390 off at step S54d when the 0.5 sec timer times out at step S54c. This assures that wherever the panel may be located, the buzzer 390 sounds for a time interval of 0.5 second initially when the full slide closed operation is commanded.

The microprocessor 110 then commands the transistor circuit 250 of the motor driver to energize the motor 11 for reverse rotation at step S54e, by establishing an L and an H level at the output ports O0 and O7, respectively.

It will be noted that the command for the full slide closed operation is read only during the modes I and II. The reverse rotation of the motor 11 drives the panel 23 toward its fully closed position (FIG. 11b). The control of the full slide closed operation terminates when any switch other than the switch SWC is closed, when a change occurs from the mode II to mode III, or when an overload is detected during the steady-state drive in the closing direction to stop the motor temporarily, and the drive is reversed for a reduced time interval, followed by the deenergization of the motor. To prevent a situation that a starting current having an excessive magnitude flows through the motor 11 during the starting phase thereof and is detected as an overload to prevent the motor from being driven, the microprocessor 110 starts a timer ts at step S55, the upon time-out (step S56), it loads the content of the mode register [A, B] into a previous mode register [A₀, B₀] at step S57, and reads the open or closed conditions of the limit switches 200a, 200b to update the mode register [A, B]. At next step S60, the microprocessor 110 refers to the content of the mode register [A, B] to determine if the mode III is established. If the mode III is established, it proceeds to step S89a where it deenergizes the motor 11. If the mode III is not established, the program proceeds to step S61 where it is determined whether the mode established is IA (the given range of opening). If the mode IA is established, the microprocessor clears one second timer at step S61e, and determines the previous mode by referring to the content of the previous mode register [A₀, B₀] at step S62. Assuming that the previous mode was IB, a change from the mode IB to the mode IA causes the program to proceed to the control of a temporary panel stop operation which begins with step S85 shown in FIG. 16f.

If the previous mode was not IB, it follows that the previous mode as well as the current mode are the mode IA. Accordingly, the microprocessor refers to an overload detecting flag at step S63, and in the event the overload detecting flag is not set, it turns the transistor 343 on and then off at step S64. When the transistor 343 is turned on temporarily, the transistor 342 is turned off once, whereby the capacitor 341 in the storage circuit 340 maintains a voltage which is formed by dividing the value Vcc−Vs by means of the voltage dividers 345, 346. In other words, an overload reference voltage which is normally used during the sliding movement in the closing direction is established in the storage circuit 340.

At next step S65, the microprocessor sets the overload detecting flag, reads an output from the comparator 370, and proceeds to the control of the overload stop operation which begins with step S68 shown in FIG. 16f whenever the output has an H level indicating the presence of an overload. When the output of the comparator 370 has a low level, the microprocessor reads the switch input ports at step S67a and determines whether any switch other than the fully closed command switch SWC is closed, at step S67b. If any switch is closed, the program proceeds to a step S89a where the motor is deenergized. If no switch is closed, the program proceeds to intermittent energization of the buzzer 390 which begins with step S103.

If it is determined that the mode IA is not established at step S61a, a check is made to see if one second timer has started at step S61b. If not, the one second timer is started at step S61c and then the program returns to the step S57. If the one second timer has started, a check is made at step S61d to see if it has timed out. If it has timed out, the program proceeds to the step S63. Otherwise the program proceeds to the step S57.

If an overload has caused the deenergization of the motor 11 (step S68 in FIG. 16f), the microprocessor 110 produces a command to deenergize the motor, turns the buzzer 390 off and starts a timer ts (S69). Upon time-out (S70), the microprocessor delivers an output at step S71 which energizes the motor 11 for forward rotation (the slide open operation), and also starts a timer at at step-S72. Upon time-out of the timer at at step S73, the microprocessor deenergizes the motor at step S90, reads the condition of the open/close command switch at step S91, and checks if any switch other than the switch SWC is closed at step S92. If any switch is closed, it turns the buzzer 390 off at step S93a, whereby the buzzer ceases to sound. It also clears the overload detecting flag at step S93b and then returns to the step S3. If no other switch is closed, the possibility that a contact with any obstacle may have occurred is examined by starting a timer dt at step S94 and reading the open/close command switch upon time-out (S73) at step S91.

The above control procedure including the detection of an overload, the deenergization of the motor, the energization of the motor for forward rotation and the deenergization of the motor assures that in the event of occurrence, during the modes IB and IA when the closure panel is driven for the full slide closed operation, of an overload having a magnitude greater than a steady-state load for normally driving the panel 23 for the sliding closed operation, the motor 11 be stopped temporarily and the buzzer 390 is energized, followed by the energization of the motor 11 for forward rotation for a given time interval at after the movement of the panel 23 has been stopped, thus slightly opening the panel 23, whereupon the motor 11 is deenergized. The energization of the buzzer 390 continues until the switch SWO or SWC becomes closed.

The control of the intermittent energization of the buzzer which begins with the step S103 shown in FIG. 16e will now be described. Initially it is determined at step S103 whether the buzzer 390 is set for its on condition (energization). If it is not set on, a check is made at step S104 to see if a 0.15 second timer which presets an off period has started. If this timer is not counting the time limit, it is then checked if it has timed out. If the timer has not timed out, the 0.15 second timer which presets the buzzer off period is started, and then the program returns to the step S57.

Upon time-out of the 0.15 second timer, the buzzer 390 is set on, and the 0.1 second timer which presets a buzzer on period is started, and the program returns to the step S57. If it is determined at step S103 that the buzzer 390 is set on, a check is made at step S108 to see if the 0.1 second timer has timed out. If it has not timed out, the program returns to the step S57, and otherwise the program proceeds to a step S109 where the buzzer 390 is turned off, and the 0.15 second timer which presets the off period is set at step S110, subsequently returning to the step S57. The described control assures that during the mode IA of the panel, the buzzer 390 is intermittently energized to sound for 0.1 second and deenergized for the following 0.15 second, followed by another interval of 0.1 second during which it is energized.

The control of the temporary stop of the panel when changing from the mode IB to IA will now be described. When the mode changes from IB to IA, it means that the panel 23 has advanced to a point which is 10 cm short of the fully closed position. Accordingly, the motor 11 is deenergized at step S85, and the content of a count register is checked at step S86. Unless the content of the count register is equal to 5, a check is then made at step S87 to see whether the content is an even number (0, 2, 4). If the content is an even number, the microprocessor starts a 0.5 second timer for longer period energization of the buzzer and sets the buzzer 390 for energization. Upon time-out (S96), the microprocessor returns the buzzer 390 to its off condition at step S97 and increments the count register by one count, then returning to the step S86. If it is determined at step S86 that the content of the count register is not equal to 5, a check is made at step S87 to see if the content of count register is or is not an even number. If it is not an even number, a 0.25 second timer which presets a buzzer off period is started at step S98. Upon time-out (S99), the count register is incremented by one count at step S100, then returning to the step S86. If the content of the count register is equal to 5, this means that an on-off control of the buzzer 390 has been achieved by turning the buzzer 390 on for 0.5 second, off for the following 0.25 second, again on for the next following 0.5 second, and then off for the 0.25 second and finally on for the further period of 0.5 second. In the meantime the motor 11 remains stationary for a total of 2 seconds.

The microprocessor 110 then returns to the step S54e (FIG. 16e), and energizes the motor 11 for reverse rotation. As before, a check for the detection of the occurrence of an overload is made after the starting period for the motor 11 has passed, and in the event an overload has occurred, the motor is deenergized and the continuous alarm is given. If the motor continues its reverse rotation in a normal manner, the program loops around the steps S57, S61a, S62, S63 . . . S66, S67a, S67b, S103 . . . S57 and S61a during the mode IA, thus intermittently energizing the buzzer 390 for an on period of 0.1 second and an off period of 0.15 second. During the mode II, the program loops around the steps S61a, S61d, S63 . . . S66, S67a, S67b, S103 . . . S57 and S61a during the mode II, again intermittently energizing the buzzer 390 for an on period of 0.1 second and an off period of 0.15 second. When the mode III is established, the program proceeds from step S60 to step S89a where the motor 11 is deenergized, and the buzzer 390 is turned off at step S89b, and the overload detecting flag is cleared at step S89c, and the program then returns to the step S3 shown in FIG. 16a.

It will be seen from the above description concerning the control of the slide closed operation that if, for example, the switch SWC is closed when the panel 23 is fully open (see FIG. 11d) or during the mode IB, the buzzer 390 initially sounds for 0.5 second, followed by the initiation of the reverse rotation of the motor 11. After a time interval of ts from the initiation of the reverse rotation plus one second, an overload reference value corresponding to the steady-state motor current which prevails when it is driven for its slide closed operation is established across the capacitor 341 in the storage circuit 340, thus allowing an overload detection to be initiated. When the mode changes from IB to IA, the motor 11 is caused to stop and the buzzer is intermittently energized with a long period. After the motor remains at rest for two seconds and the buzzer is intermittently energized, the reverse rotation of the motor 11 is re-initiated together with an intermittent energization of the buzzer with a short period. At time interval of ts after such initiation, an overload reference value corresponding to the steady-state motor current which prevails during the time it is driven for its slide closed operation is established across the capacitor 341 in the storage circuit 340, thus allowing the detection of an overload to be initiated. When the mode changes from IA to II, since the one second timer is cleared at step S61e during the mode IA, the one second timer is started again during the mode II. Since the mode II has a time duration less than one second, no detection of an overload is performed. When the mode changes from II to III, the motor 11 is caused to stop as is the repeated energization of the buzzer with a short period.

If the occurrence of an overload is actually detected during the described overload detection interval, the motor 11 is deenergized temporarily with the buzzer 390 energized continuously. Subsequently, the motor 11 is energized for forward rotation during a time interval of at to open the panel 23 slightly, whereupon the motor is deenergized again. The buzzer continues to be energized until the switch SWO becomes closed.

It will be seen that the mode IA can be read in a unique manner by the combination of the switches 200a and 200b, and since the buzzer 390 is intermittently energized with a short period when the program loops around the steps S57 . . . S61a . . . S66, S67a, S67b, S103 . . . S57 during the mode IA, it will be understood that the buzzer 390 is intermittently energized with a short period when the mode changes from IB to IA as well as when the switch SWC is closed and the apparatus is in the mode IA when the power supply is turned on.

It will be seen from the foregoing description that the alarm means is energized not only when the closure member is driven from its fully open to its fully closed position, but also when the power supply is turned on with the closure member located at an opening within the given range of opening (mode IA) and is then driven toward its fully closed position. In other words, alarm means is energized to draw the attention of a user or driver whenever the closure member is located to define an opening within the given range of opening, regardless of the particular step to which the driven control of the closure member has advanced since the turn-on of the power supply or if the closure member defines an opening within the given range immediately after the power supply is turned on and is then driven toward its fully closed position.

What is claimed is:

1. An apparatus for automatically opening and closing a closure member associated with an opening, comprising
an electric drive mechanism including an electric motor and an opening and closing mechanism which drives a closure member associated with an opening in an opening or closing direction in response to a forward or reverse rotation of the electric motor;
signal generating means for generating an electrical signal which corresponds to a movement of the opening and closing mechanism;
means for detecting a load acting upon the opening and closing mechanism;
reference means for establishing an overload reference value;
means for detecting an overload by comparing the load acting upon the opening and closing mechanism against the reference value;
a motor driver for energizing the electric motor for forward or reverse rotation;
open/close command switch means for commanding an opening or closing movement of the closure member;
alarm means;
an alarm driver for energizing the alarm means;
an open/close control means responsive to a signal generated by the signal generating means and the operation of the open/close command switch means for causing the motor driver to energize the electric motor for forward or reverse rotation and to stop the motor, for causing the alarm driver to give an alarm whenever a signal generated by the signal generating means indicates an opening within a given range of opening and the motor is being driven toward its fully closed position, and for causing the motor driver to stop the motor in the event an overload is detected;
said signal generating means comprises a switch actuating cam in the form of a disc coupled to the electric drive mechanism for rotation with the electric motor, the cam being peripherally formed with two pairs of high and low areas which are effective to actuate switches, a first switch disposed in opposing relationship with one pair of high and low areas so as to be operated thereby to be closed or opened, and a second switch disposed in opposing relationship with the other pair of high and low areas so as to be operated thereby to be opened and closed, the combination of the switch signals representing their open and closed conditions being effective to define four operational modes, one of which is allocated to denote the given range of opening.

2. An apparatus according to claim 1 in which the open/close control means causes the motor drive to stop the electric motor temporarily whenever a mode defined by the signals from the first and the second switch indicate a change into said one mode representing the given range of opening from any other mode during the closing movement of the closure member.

3. An apparatus according to claim 1 in which the electric drive mechanism includes the electric motor, and an opening and closing mechanism which drives the closure member for a tilt open and a tilt closed operation as well as for a slide open and a slide closed operation in response to the forward or reverse rotation of the electric motor.

4. An apparatus according to claim 2 in which the open/close control means causes the alarm driver to give an alarm during the time the motor is stopped temporarily.

5. An apparatus according to claim 4 in which the open/close control means causes an alarm to be given intermittently with a relatively long period during the time the motor is stopped temporarily and causes an alarm to be given intermittently with a relatively short period during the time the closure member is driven in the closing direction within the given range of opening.

6. An apparatus according to claim 4 in which the open/close control means causes the alarm driver to give an alarm when it has detected an overload to stop the motor.

7. An apparatus for automatically opening and closing a closure member associated with an opening, comprising
an electric drive mechanism including an electric motor and an opening and closing mechanism which drives a closure member associated with an opening in an opening or closing direction in response to a forward or reverse rotation of the electric motor;
signal generating means for generating an electrical signal which corresponds to a movement of the opening and closing mechanism;
means for detecting a load acting upon the opening and closing mechanism;
reference means for establishing an overload reference value;
means for detecting an overload by comparing the load acting upon the opening and closing mechanism against the reference value;
a motor driver for energizing the electric motor for forward or reverse rotation;
open/close command switch means for commanding an opening or closing movement of the closure member;
alarm means;
an alarm driver for energizing the alarm means;
an open/close control means responsive to a signal generated by the signal generating means and the operation of the open/close command switch means for causing the motor driver to energize the electric motor for forward or reverse rotation and to stop the motor, for causing the alarm driver to give an alarm whenever a signal generated by the signal generating means indicates an opening within a given range of opening and the motor is being driven toward its fully closed position, and for causing the motor driver to stop the motor in the event an overload is detected in which the open/closed control means causes the motor drive to stop the electric motor temporarily whenever a mode defined by the signals from the first and second switches indicates a change into said one mode representing the given range of opening from any other mode during the closing movement of the closure member and in which the electric drive mechanism includes the electric motor and an opening and closing mechanism which drives the closure member for a tilt open and an tilt close operation as well as for a slide open and a slide closed operation in response to the forward or reverse rotation of the electric motor.

8. An apparatus according to claim 7 in which the open/close control means causes the alarm driver to give an alarm during the time the motor is stopped temporarily.

9. An apparatus according to claim 8 in which the open/close control means causes an alarm to be given intermittently with a relatively long period during the time the motor is stopped temporarily and causes an alarm to be given intermittently with a relatively short period during the time the closure member is driven in the closing direction within the given range of opening.

10. An apparatus according to claim 9 in which the open/close control means causes the alarm driver to give an alarm when it has detected an overload to stop the motor.

* * * * *